United States Patent
Takata et al.

(10) Patent No.: US 8,209,498 B2
(45) Date of Patent: Jun. 26, 2012

(54) METHOD AND SYSTEM FOR TRANSFERRING DUPLICATE FILES IN HIERARCHICAL STORAGE MANAGEMENT SYSTEM

(75) Inventors: Masanori Takata, Yokohama (JP);
Hitoshi Kamei, Sagamihara (JP);
Atsushi Sutoh, Yokohama (JP);
Takahiro Nakano, Yokohama (JP);
Nobumitsu Takaoka, Sagamihara (JP);
Akio Shimada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 259 days.

(21) Appl. No.: 12/642,559

(22) Filed: Dec. 18, 2009

(65) Prior Publication Data

US 2011/0078112 A1   Mar. 31, 2011

(30) Foreign Application Priority Data

Sep. 30, 2009   (JP) .................................. 2009-225860

(51) Int. Cl.
*G06F 17/30* (2006.01)
(52) U.S. Cl. ........................................ 711/150; 711/151
(58) Field of Classification Search .................. 711/150, 711/151
See application file for complete search history.

(56) References Cited

U.S. PATENT DOCUMENTS

| | | | | |
|---|---|---|---|---|
| 6,105,057 | A * | 8/2000 | Kuftedjian et al. | 709/213 |
| 6,505,281 | B1 * | 1/2003 | Sherry | 711/168 |
| 6,725,334 | B2 * | 4/2004 | Barroso et al. | 711/122 |
| 6,785,794 | B2 * | 8/2004 | Chase et al. | 711/170 |
| 7,127,581 | B2 * | 10/2006 | Watanabe | 711/165 |
| 7,392,317 | B2 * | 6/2008 | Halpern | 709/228 |
| 7,403,996 | B2 * | 7/2008 | Halpern | 709/228 |
| 7,487,245 | B2 * | 2/2009 | Douceur et al. | 709/226 |
| 7,584,228 | B1 * | 9/2009 | Protassov et al. | 1/1 |
| 2004/0193760 | A1 | 9/2004 | Matsunami et al. | |
| 2008/0243769 | A1 | 10/2008 | Arbour et al. | |
| 2008/0244204 | A1 | 10/2008 | Cremelie et al. | |
| 2010/0095164 | A1 | 4/2010 | Kamei et al. | |

OTHER PUBLICATIONS

U.S. Appl. No. 12/575,138, filed Oct. 7, 2009, Shimada.

* cited by examiner

*Primary Examiner* — Kim Nguyen
(74) *Attorney, Agent, or Firm* — Foley & Lardner LLP

(57) ABSTRACT

In order to provide HSM that can effectively use the storage capacity of an upper Tier in an HSM system, a lower Tier of the HSM system detects a group of files having the same data content from a plurality of files stored in the lower Tier, and keeps at least one of the real data of the group of files having the same data content while deleting the rest of the data. The upper Tier receives the process result from the lower Tier. Then, in response to a read request from the host computer that specifies a file included in the group of files and transferred to the upper Tier from the lower Tier, the upper Tier identifies the at least one of the data that is kept and corresponding to the specified file, and responds to the host computer.

20 Claims, 16 Drawing Sheets

FIG. 5

CONTENT MANAGEMENT TABLE 500

| CONTENT ID | 10 | 11 | ... | 100 |
|---|---|---|---|---|
| FINGERPRINT | 0xff | 0xfe | ... | 0x77 |
| FILE GROUP | A,C | B,D | ... | X,Y,Z |

- 501: CONTENT ID
- 502: FINGERPRINT
- 503: FILE GROUP

FIG. 6

DUPLICATE FILE TABLE 600

| CONTENT ID | 10 | | ... | 100 | | |
|---|---|---|---|---|---|---|
| FILE NAME | A | C | ... | X | Y | Z |
| is_stub | 0 | 1 | ... | 1 | 0 | 0 |

- 601: CONTENT ID
- 602: FILE NAME
- 603: is_stub

FIG.16

CORRESPONDING TABLE (/home/user1/doc)   1600

| FILE NAME | FILE MANAGEMENT STRUCTURE NO. |
|---|---|
| A.txt | 100 |
| B.doc | 101 |
| ⋮ | ⋮ |
| X.jpg | 1000 |

1611 1612
1601 1602 1603 1604

METHOD AND SYSTEM FOR TRANSFERRING DUPLICATE FILES IN HIERARCHICAL STORAGE MANAGEMENT SYSTEM

BACKGROUND OF THE INVENTION

1. Field of the Invention

The present invention relates to a method, system, device, and program for transferring duplicate files in a hierarchical storage management system.

2. Description of the Related Art

Hierarchical Storage Management (HSM) is a technology used in a plurality of file storage devices such as storages and servers with different performances and functions, to migrate files between the file storage devices according to the use state of each file. As shown in US Patent No. 2004/0193760, in a computer system implementing HSM (hereinafter referred to as an HSM system), frequently accessed files are stored in a file storage device with high performance/bit cost (hereinafter referred to as an upper Tier) belonging to a higher hierarchy according to the access frequency, while less frequently accessed files are stored in a file storage device with low performance/bit cost (hereinafter referred to as a lower Tier) belonging to a lower hierarchy. This makes it possible to provide a computer system to a client computer, as if it has a large-scale and high-speed storage device at a lower cost. Incidentally, the data stored in the lower Tier are files that are typically updated less frequently such as, for example, a backup file that the user keeps without deleting the file as a backup in case anything goes worth, a file that the user has finished frequently referring to, and a file that the user has to hold without deleting it for a legally prescribed period.

There is known a de-duplication technology for reducing the data storage capacity by eliminating duplicate data. The de-duplication technology in a file storage device for specifying a target file by path name and file name in a network file system (NFS), and the like, includes the following three steps:
(A) Find a group of files with the same data content, from a plurality of files stored in the file storage device;
(B) Keep at least one real data of the group of files with the same data content, and delete the rest of the data; and
(C) In response to a read request that specifies a file included in the group of files, identify the at least one of the data that is kept and corresponding to the specified file, and transmit the identified data.

US Patent No. 2008/0243769A1 discloses a method for transferring data from a storage having a de-duplication function for backup data, to a backup storage having no de-duplication function, by way of returning de-duplicated data to non-de-duplicated data.

US Patent No. 2008/0244204A1 discloses a method for duplicating a storage area between backup servers in a network including a plurality of backup servers each having a de-duplication function. This technology reduces the traffic between the backup servers, in such a way that one backup server transfers duplicate identification information of the data in the storage area to be duplicated, to another backup server, and that the other backup server detects duplication based on the duplicate identification information, and transfers only the non duplicate data.

SUMMARY OF THE INVENTION

US Patent No. 2008/0243769A1 and US Patent No. 2008/0244204A1 disclose technologies for a case in which there are a plurality of backup devices corresponding to the lower Tier in HSM. However, these technologies do not take into consideration the upper Tier, and it is difficult to effectively use the storage capacity of the upper Tier of a high bit cost. Thus, the present invention aims to provide HSM that can effectively use the storage capacity of the upper Tier.

In order to solve the above described problem, a de-duplication technology is performed in the upper Tier of the HSM system. Portions of the de-duplication processes can be performed in the upper Tier or in the lower Tier. When those processes are performed in the lower Tier, the target is the file stored in the lower Tier, and the result of the processes is transmitted to the upper Tier. Then, the remaining de-duplication processes are performed on the file transferred from the lower Tier to the upper Tier.

According to the present invention, it is possible to provide HSM that can effectively use the storage capacity of the upper Tier.

According to one aspect of the invention, there is provided a computer system. The computer system includes a first computer and a second computer. The first computer includes a first storage area for storing files transmitted/received to/from a client device. The second computer includes a second storage area for storing files migrated from the first computer. The first computer migrates a first file stored in the first storage area, to the second computer, according to the access state from the client device. The second computer generates duplicate file information by determining whether the migrated first file and any other files are identical to each other, and transmits the generated duplicate file information to the first computer. When receiving a read request to the first file from the upper device, the first computer determines whether a second file identical to the first file is stored in the first storage area based on the received duplicate file information, and when determining that the second file is stored in the first storage area, the first computer responds to the upper device by using the second file.

BRIEF DESCRIPTION OF THE DRAWINGS

Embodiments of the present invention will be described in detail based on the following figures, wherein:

FIG. 5 is a diagram showing the structure of a content management table according to an embodiment of the invention;

FIG. 6 is a diagram showing the structure of a duplicate file table according to an embodiment of the invention;

FIG. 16 is a diagram showing an example of the corresponding table between file names and file management structures according to an embodiment of the invention.

DETAILED DESCRIPTION OF THE PREFERRED EMBODIMENTS

First Embodiment

Hereinafter, a first embodiment according to the present invention will be described with reference to the accompanying drawings. It is to be understood that the present embodiment does not limit the present invention. In the following description, the information of the present invention will be described by expressions such as "xx table, "xx list", "xx DB", and "xx queue". However, the information with these expressions is not necessarily limited to the data structures of table, list, DB, and queue, and may be expressed by other data structures. In order to show the independence of the data structures, the expressions such as "xx table", "xx list", "xx DB", and "xx queue" may also be referred to as "xx" information. Further, the content of each piece of information is described using the expressions of "identification information", "identifier", "name", and "ID", which can be replaced with each other.

In the following description, "program" is sometimes used as the subject of the sentences. This, however, actually is a processor that reads a program stored in a memory to perform a predetermined process using a communication port (communication controller). For this reason, "processor" may also be the subject of the sentences. The process disclosed with "program" as the subject may be the process performed by a computer such as a management server, or an information processor. Further, a part of or all programs may be realized by dedicated hardware. Still further, various programs may be separately installed in individual computers by a program distribution server or a storage medium.

Figure 1:
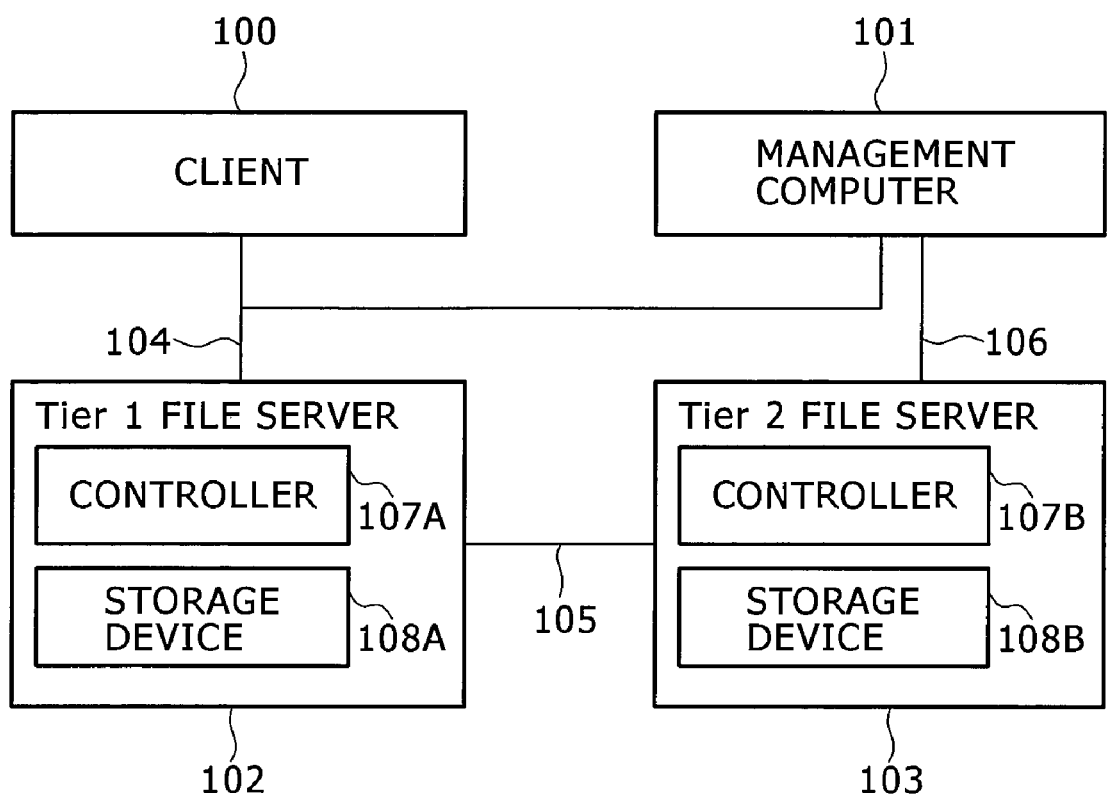
FIG. 1 is a block diagram showing an example of the configuration of a hierarchical storage management system according to an embodiment of the invention.

FIG. 1 is a block diagram showing an example of the configuration of an HSM system according to the first embodiment of the present invention. In the following, x represents an arbitrary positive integer.

The HSM system includes one or a plurality of clients 100 (client computers), a management computer 101, a Tier 1 file server 102, and a Tier 2 file server 103. The client 100, the management computer 101, and the Tier 1 file server 102 are connected by a local area network (LAN) 104. The Tier 1 file server 102 and the Tier 2 file server 103 are connected by a LAN 105. The management computer 101 and the Tier 2 file server 103 are connected by a LAN 106.

The client 100 is one or a plurality of computers using a file sharing service provided by the Tier 1 file server 102. A user of the client 100 uses the file sharing service provided by the Tier 1 file server 102 through file sharing protocols like Network File System (NFS) and Common Internet File System (CIFS). In this embodiment, the Tier 1 file server 102 corresponds to the upper Tier, and the Tier 2 file server 103 corresponds to the lower Tier.

The Tier 1 file server 102 is a file storage device for providing a file sharing service to the client 100. In this embodiment, the Tier 1 file server 102 is configured to have a controller 107A and a storage device 108A. However, another configuration is possible in which in stead of providing the storage device 108A within the Tier 1 file server 102, for example, a mid-range storage device 108A is connected to the Tier 1 file server 102 as an external device to the file server. Also, the Tier 2 file server 103 includes a controller 107B and a storage device 108B.

The management computer 101 is a computer used by an administrator who manages the Tier 1 file server 102 and the Tier 2 file server 103. The administrator manages the Tier 1 file server 102 and the Tier 2 file server 103 through the LAN 104 or the LAN 106 from the management computer 101. The management of the file servers includes starting operation of the file servers, stopping the file servers, and managing the account of the client 100. The management computer 101 also has an input/output device. Examples of the input/output device may include a display, a keyboard, and a pointer device, but other devices can also be used. Alternatively, a serial interface is used as an input/output device, to which a display computer having a display, a keyboard, or a pointer device is connected. In this case, the input and display operations in the input/output device can be replaced with the input and display operations in the display computer, in such a way that display information is transmitted to the display computer and input information is received by the display computer.

In the following, a set of one or more computers for managing the information processing system and for displaying the display information according to the present invention, may be referred to as a management system. In the case in which the management computer 101 displays the display information, the management computer 101 is a management system. The combination of the management computer 101 and the display computer is also a management system. Further, the process equivalent to that of the management computer 101 may be realized by a plurality of computers in order to increase the speed and reliability of the management process. In such a case, the plurality of computers are referred to as a management system.

Figure 2:
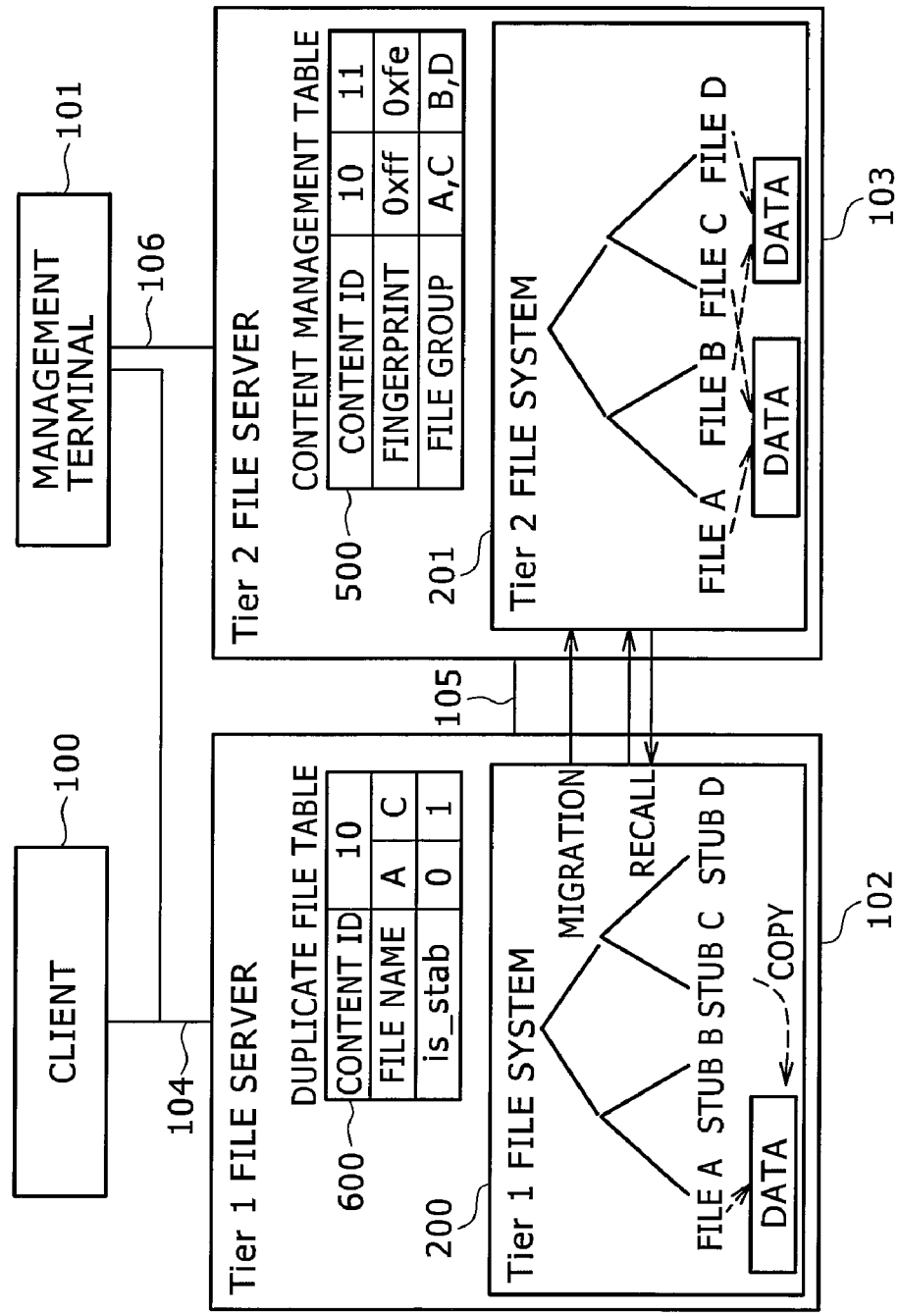
FIG. 2 is a schematic diagram of the hierarchical storage management system according to an embodiment of the invention.

FIG. 2 is a schematic diagram of the HSM system according to the first embodiment of the present invention. Here, in the HSM system, the Tier 1 file server 102 stores files that are constantly accessed from the client 100 as normal files (hereinafter referred to as data files). With respect to a file that is not accessed for a long time, the Tier 1 file server 102 performs a process for migrating the data file to the Tier 2 file server 103 (hereinafter referred to as a migration process), while keeping identification information (hereinafter referred to as a stub)

for referring to the file data stored in the Tier 2 file server 103. Incidentally, a process of generating a stub for referring to the real data (hereinafter referred to as the file data) of the file stored in the Tier 2 file server 103, and storing the generated stab in the upper Tier, is referred to as a stub process. Then, when there is an access to the file migrated to the lower Tier, the upper Tier performs a process of transferring the file data from the lower Tier (hereinafter referred to as a recall process). Then, the upper Tier returns the stubbed file to the data file.

In this embodiment, the Tier 1 file server 102 is the upper Tier file server capable of high speed access from the client 100 by not performing the (A) and (B) processes of the de-duplication process. The Tier 2 file server 103 is the lower Tier file server having a de-duplication function. Incidentally, the de-duplication technology in the file server can be classified into two major types: a file level de-duplication technology for performing de-duplication in the unit of file, and a block level de-duplication technology for performing de-duplication in the unit of block. The file level de-duplication is a technology for the case in which there are two or more files whose file data are completely the same, storing only one file data while deleting the file data of the other file(s). The files with the completely same file data are called duplicate files. The block level de-duplication is a technology for eliminating data blocks with the same content in the unit of block. The present embodiment is described assuming that the Tier 2 file server 103 has the file level de-duplication function.

The Tier 1 file server 102 has a Tier 1 file system 200, storing data generated by the client 100 in a file format. The Tier 2 file server 103 has a Tier 2 file system 201, storing a file migrated from the Tier 1 file server 102. The Tier 2 file server 103 manages the file by a content management table 500. The content represents the file data. The Tier 2 file server 103 assumes the file data of duplicate files as the same content. The Tier 1 file server 102 has a duplicate file table 600. The Tier 1 file server 102 stores the duplicate file information obtained from the Tier 2 file server 103 into the duplicate file table 600.

In FIG. 2, file A, file B, file C, and file D satisfy the migration conditions set by the administrator that will be described below. The Tier 1 file server 102 migrates the files from the Tier 1 file server 102 to the Tier 2 file server 103. The Tier 2 file server 103 stores the migrated files in the Tier 2 file system 201. The Tier 1 file system 200 stores the migrated files as stubs. The files migrated to the Tier 2 file server 103 are de-duplicated by the de-duplication process of the Tier 2 file system 201. As a result of the de-duplication process, the file A and the file C are found to be duplicate files sharing the same data block. The file B and the file D are also found to be duplicate files sharing the same data block. The content management table 500 stores the duplicate file information.

After the migration of the files, when there is an access to a stub file from the client 100, the Tier 1 file server 102 determines the presence or absence of a duplicate file in the Tier 1 file server 102 based on the duplicate file table 600. When no duplicate file is present in the Tier 1 file server 102, the Tier 1 file server 102 performs a recall process. For example, when there is an access to the file B, the Tier 1 file server 102 performs a recall process on the file B because there is no entry of the file B in the duplicate file table 600 of the Tier 1 file server 102. Here, in this embodiment, the Tier 2 file server 103 adds the duplicate file information of the target file to be recalled in the recall process. For example, when there is an access to the file A from the client 100, the Tier 2 file server 103 transfers the file data of the file A to the Tier 1 file server 102. At this time, the Tier 2 file server 103 also transfers the information that the file A and the file C are the same files, to the Tier 1 file server 102. The Tier 1 file server 102 stores the received duplicate file information into the duplicate file table 600. As a result, when there is an access to a file with a duplicate file in the Tier 1 file server 102, the Tier 1 file server 102 can omit the recall process on the accessed file by sharing the data block of the duplicate file. FIG. 2 shows an example in which when subsequently there is an access to the file C, the Tier 1 file server 102 detects that the file A is the same file as the file C from the duplicate file table 600 and shares the data block of the file A. In this way, the Tier 1 file server 102 can achieve a high speed file access, without a need to perform the recall process in response to the access to the migrated file C from the client 100. Further, the Tier 1 file server 102 can reduce the capacity of the Tier 1 file server 102 by sharing the data block of the duplicate files.

Figure 17:
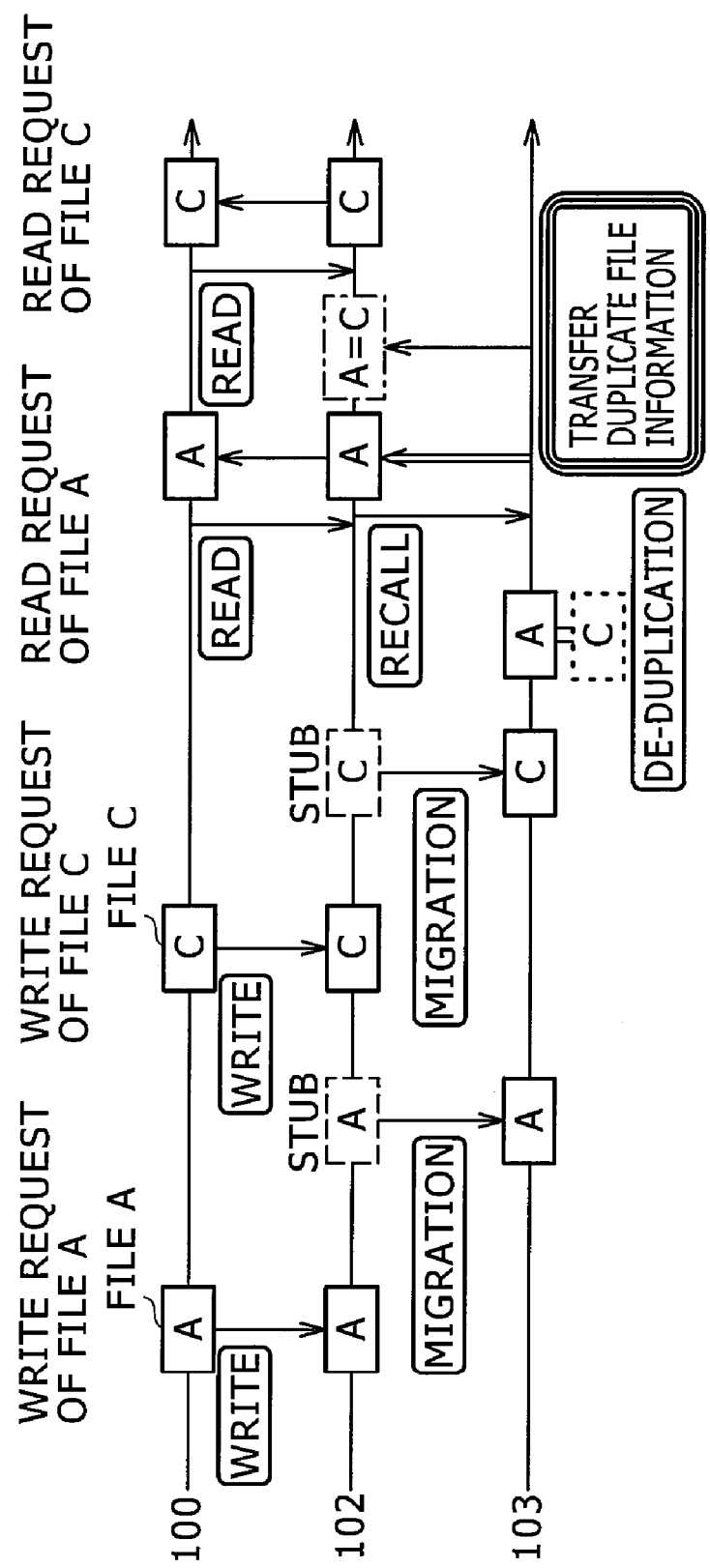
FIG. 17 is a schematic diagram showing an example of the time chart of the file write process, file read process, de-duplication process, migration process, and recall process according to an embodiment of the invention.

FIG. 17 is a time chart schematically showing the file write process, the file read process, the migration process, the de-duplication process, and the recall process. Incidentally, the file names shown in FIG. 17 correspond to the file names shown in FIG. 2. As shown in FIG. 17, in this embodiment, after the migration process of the file A and the file C, it is determined that the file A and the file C are identical to each other, so that the files are de-duplicated by the de-duplication process. Then, at the time of the recall process of the file A, the Tier 2 file server 103 transfers the duplicate file information held by the Tier 2 file server 103 that the file A and the file C are identical to each other, to the Tier 1 file server 102. The Tier 1 file server 102 holds the duplicate file information. When there is a read request to the file C, the Tier 1 file server 102 determines that the file A identical to the file C is stored in the Tier 1 file system 200. Then, the Tier 1 file server 102 transmits using the real data of the file A in response to the read request, without performing the recall process from the Tier 2 file system 201. In this way, it is possible to reduce the number of recalls in the HSM system.

Figure 3:
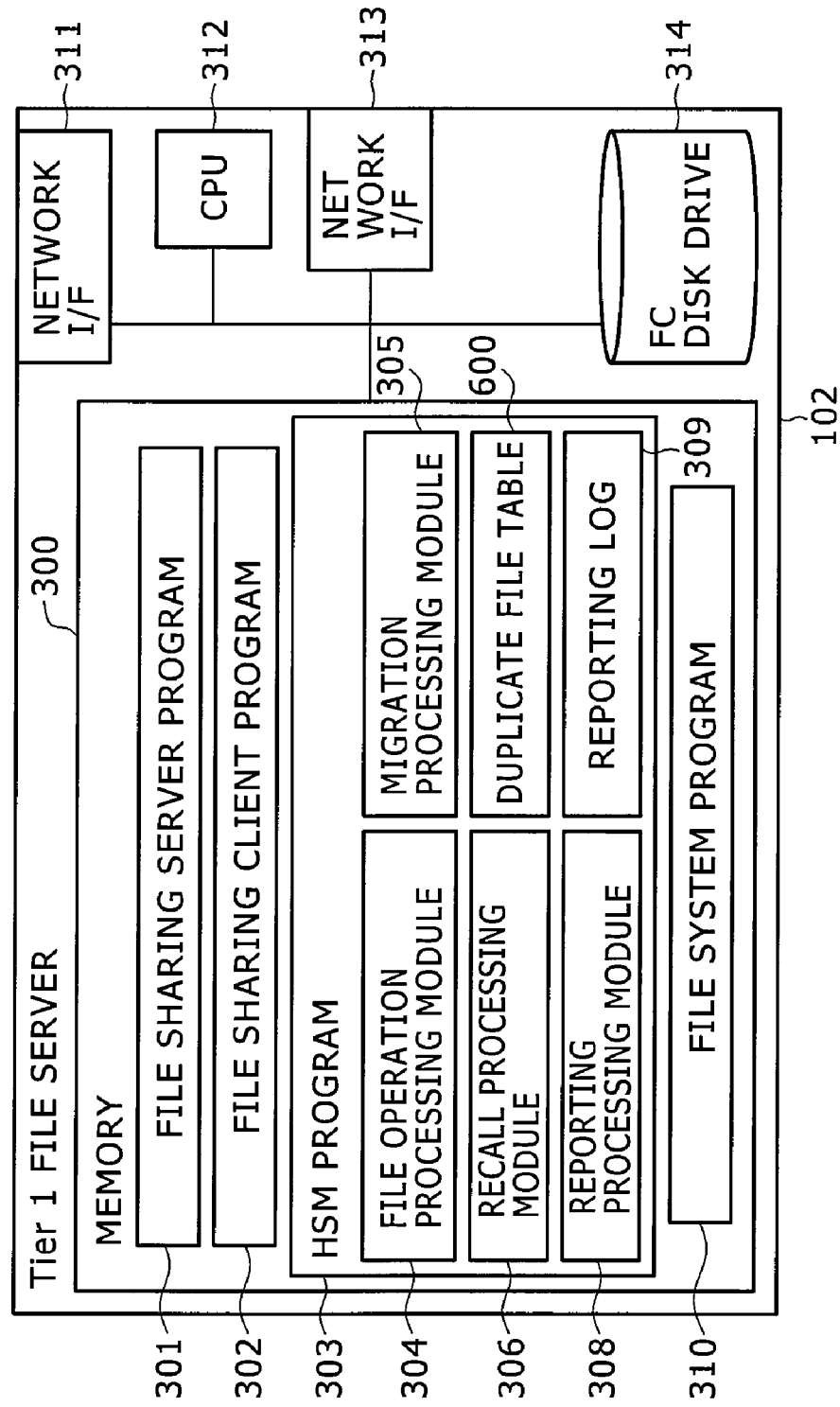
FIG. 3 is a block diagram of the hardware and software of a Tier 1 file server according to an embodiment of the invention.

FIG. 3 shows an example of the configuration of the Tier 1 file server 102. The Tier 1 file server 102 is a computer including a CPU 312 for performing programs stored in a memory 300, a network interface 311 used for communication with the client 100 and the management computer 101 through the LAN 104, a network interface 313 used for communication with the Tier 2 file server 103 through the LAN 105, a fibre channel (FC) disk drive 314, and the memory 300 for storing the programs and data, all of which are connected by internal communication lines (for example, buses). Of the configurations of the Tier 1 file server 102, the FC disk drive 314 corresponds to the storage device 108A shown in FIG. 1, and the other configurations, except for the FC disk drive 314, correspond to the controller 107A shown in FIG. 1.

The FC disk drive 314 is one or more disk drives with FC interface, which is a secondary storage device for storing the programs and files used by the Tier 1 file server 102. In this embodiment, the FC disk drive 314 is used as the secondary storage device of the Tier 1 file server 102. However, other storage devices may also be used, such as a solid state drive (SSD), a serial attached SCSI (SAS) disk drive, a serial advanced technology attachment (SATA) disk drive, a non-volatile memory such as a flash memory, and a tape device. In the present embodiment, as the Tier 1 file server 102 corresponds to the upper Tier, it is preferable that the storage medium corresponding to the FC disk drive 314 has a high performance and a high bit cost compared to the storage medium held by the Tier 2 file server 103.

The memory 300 stores a file sharing server program 301, a file sharing client program 302, an HSM program 303, a file system program 310, and an operating system (OS) not shown. Incidentally, it is also possible that the programs are stored in the FC disk drive 314, and read to the memory and executed by the CPU 312. The file sharing server program 301 is a program that provides a means for the user to perform a file operation on the file in the Tier 1 file server 102. The file sharing client program 302 is a program that provides a means for the Tier 1 file server 102 to perform a file operation on the file in the Tier 2 file server 103.

The HSM program 303 includes a file operation processing module 304, a migration processing module 305, a recall processing module 306, the duplicate file table 600, a reporting processing module 308, and a reporting log 309. The file operation processing module 304 applies a file operation requested by the client 100 through the file sharing server program 301, to the Tier 1 file system 200. The migration processing module 305 migrates the file from the Tier 1 file server 102 to the Tier 2 file server 103. The recall processing module 306 performs a recall process when the file the client 100 has requested to access is a stub. The duplicate file table 600 stores duplicate file information obtained from the Tier 2 file server 103. The reporting processing module 308 converts the results of the processes applied to the HSM system into statistic information and the like, and displays the information in the management computer 101. The reporting log 309 is an area in which the results of the processes applied to the HSM system are stored. The file system program 310 controls the Tier 1 file system 200.

Figure 4:
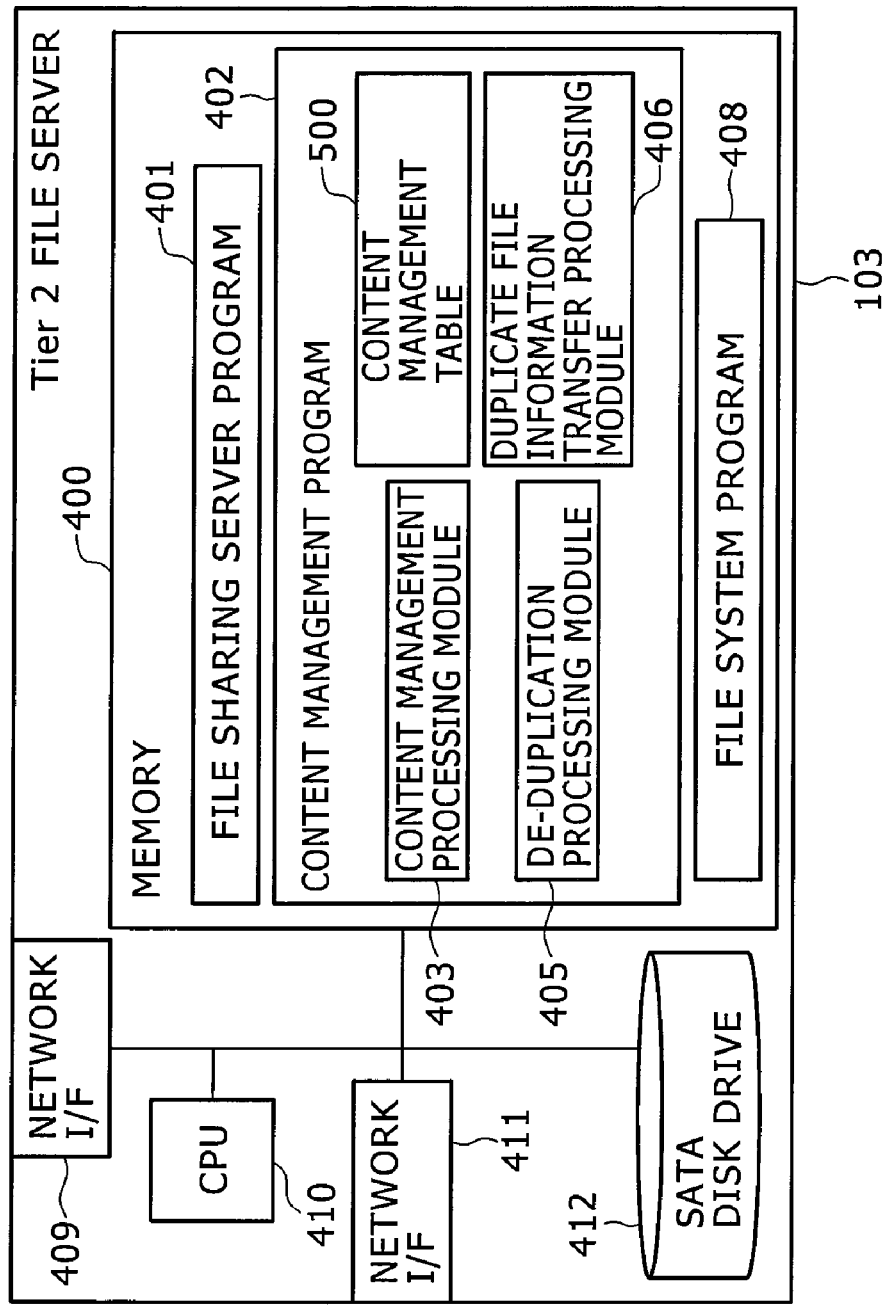
FIG. 4 is a block diagram of the hardware and software of a Tier 2 file server according to an embodiment of the invention.

FIG. 4 shows an example of the configuration of the Tier 2 file server 103. The Tier 2 file server 103 is a computer including a CPU 410 for executing programs stored in a memory 400, a network interface 409 used for communication with the management computer 101 through the LAN 106, a network interface 411 used for communication with the Tier 1 file server 102 through the LAN 105, a SATA disk drive 412, and the memory 400, all of which are connected by internal communication lines. Of the configurations of the Tier 2 file server 103, the SATA disk drive 412 corresponds to the storage device 108B shown in FIG. 1, and the other configurations except for the SATA disk drive 412 correspond to the controller 107B shown in FIG. 1.

The SATA disk drive 412 is one or more disk drives with SATA interface, which is a secondary storage device for storing the programs and files used by the Tier 2 file server 103. In this embodiment, the SATA disk drive is used as the secondary storage device of the Tier 2 file server 103. However, other storage devices may also be used, such as a SSD, an FC disk drive, an SCSI disk drive, a nonvolatile memory such as a flash memory, and a tape device. In the present invention, as the Tier 2 file server 103 corresponds to the lower Tier, it is preferable that the storage medium corresponding to the SATA disk drive 412 has a low performance and a low bit cost compared to the storage medium of the Tier 1 file server 102.

The memory 400 stores a file sharing server program 401, a content management program 402, a file system program 408, and an OS (not shown). Incidentally, it is also possible that the programs are stored in the SATA disk drive 412, and read to the memory 400 and executed by the CPU 410. The file sharing server program 401 is a program that provides a means for the Tier 1 file server 102 executing the file sharing client program 302, to perform a file operation on the file in the Tier 2 file server 103.

The content management program 402 includes a content management processing module 403, the content management table 500, a de-duplication processing module 405, and a duplicate file information transfer processing module 406. The content management processing module 403 applies a file operation requested by the Tier 1 file server 102 through the file sharing server program 401, to the Tier 2 file system 201. The content management table 500 is a table for managing files stored in the Tier 2 file system 201. The de-duplication processing module 405 performs a de-duplication process on the file stored in the Tier 2 file system 201. The duplicate file information transfer processing module 406 transfers the duplicate file information stored in the content management table 500, to the Tier 1 file server 102. The file system program controls the Tier 2 file system 201.

FIG. 5 shows an example of the content management table 500 stored in the memory 400 of the Tier 2 file server 103. The content management table 500 stores records having the following fields: a content ID 501, a fingerprint 502, and a file group 503. Each record corresponds to a content stored in the Tier 2 file server 103, storing the information of the corresponding content.

The content ID field 501 of each record is a field for storing a unique ID assigned as an identifier to identify a group of duplicate files. The content ID is provided to a newly stored file when the Tier 2 file server 103 performs a migration process. Further, when a de-duplication process is performed after a predetermined period of time has elapsed, upon the extraction of a new file identical to the group of files registered in the content management table 500, the Tier 2 file server 103 manages the new duplicate file associated with the registered content ID. The fingerprint filed 502 stores a value generated by applying a hash function to the file data of the specific content ID 501. Examples of the hash function are Secure Hash Algorithm 1 (SHA1) and Message Digest Algorithm 5 (MD5). In the present embodiment, fingerprints are used as the duplication identification information to compare the files to determine whether they are duplicate files. However, it is also possible to compare the file data against each other, instead of using the fingerprints. The file group field 503 stores the file names (identification information for identifying the files such as the paths) of the file group having the specific content ID 501.

FIG. 6 shows an example of the duplicate file table 600 stored in the memory 300 of the Tier 1 file server 102. The duplicate file table 600 stores records having the following three fields: a content ID 601, a file name 602, and a stub flag 603. Each record corresponds to a file stored in the Tier 1 file server 102, storing the information of the corresponding file.

The content ID field 601 stores the content ID 501 assigned to the duplicate file group, which is obtained from the duplicate file information received from the Tier 2 file server 103 at an arbitrary timing. The Tier 1 file server 102 can receive the duplicate file information from the Tier 2 file server 103 at the following timings. That is, when a read request is issued to a file stored in the Tier 2 file server 103 and a recall process is performed on the file as described below with reference to FIG. 11, or when a write request is issued to a file stored in the Tier 2 file server 103 and a recall process is performed on the file as described below with reference to FIG. 13. Others are, for example, the timing when the de-duplication process is completed in the Tier 2 file server 103 as described below with reference to FIG. 15, the timing on a regular basis set by the administrator, the timing when the de-duplication process is performed following the migration process, and the timing when the file is migrated and stored in the Tier 2 file server 103. The file name field 602 stores the file name (identification information for identifying the file, such as the path) in the Tier 1 file server 102. The stub flag field 603 stores the flag indicating whether the corresponding file is a stub or a data file. The stub flag 603 with value "1" indicates that the file is a stub, while with value "0" indicating that the file is a data file.

Figure 7:
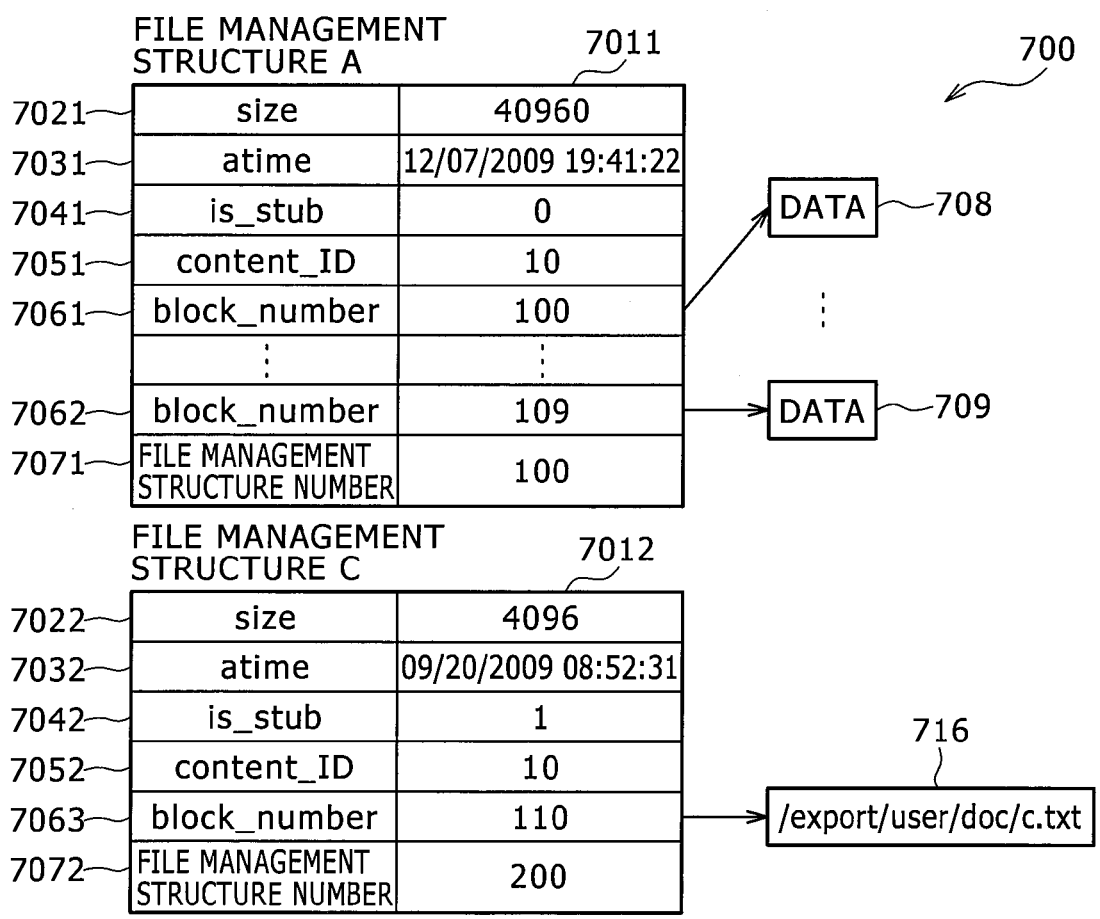
FIG. 7 is a diagram showing the structure of file management structures according to an embodiment of the invention.

FIG. 7 shows a file management structure 700 of the Tier 1 file system 200 of the Tier 1 file server 102. In the Tier 1 file system 200, each file has the metadata about the file, in addition to the file data. The metadata includes the size and the last access date and time, or other information, (702$x$ to 705$x$ in FIG. 7). The Tier 1 file system 200 stores the metadata as the file management structure 700 into the file system. Further, the Tier 1 file system 200 stores a block number (706$x$ in FIG. 7) indicating the location of the file data into the file management structure 700. The file management structure 700 corresponds to an inode in a UNIX-like file system such as a third extended file system (EXT3). The client 100 specifies the file based on the file name (identification information for identifying the file, such as the path), and makes a file access request to the Tier 1 file system 200. The Tier 1 file system 200 responds to the file request through the corresponding file management structure 700, with respect to the file that the client 100 has requested to access. Incidentally, the Tier 1 file system 200 has a corresponding table 1600 between the file name and the file management structure 700 shown in FIG. 16, in order to identify the file management structure 700 of the file specified by the file name by the client 100.

A size field 702$x$ stores a value of the file size in byte units. An atime field 703$x$ stores the last access date and time of the file. An is_stub field 704$x$ stores whether the file is a stub or a data file, with 1 indicating stub and 0 indicating data file. A content_ID field 705$x$ stores the content ID 501 obtained from the Tier 2 file server 103. The initial value of the content_ID field 705$x$ is NULL (the value not used for the content_ID). A block_number field 706$x$ stores the location of the file data. The block size of the Tier 1 file system 200 is fixed in length, and the number of the block_number field 706$x$ varies depending on the file size.

A file management structure A7011 represents the file management structure 700 of a data file. In the case of the data file, the value of the is_stub field 704$x$ is "0", and the block_number field 706$x$ indicates the location of each of file data (708, 709 in FIG. 7) stored in the Tier 1 file system 200. A file management structure C7012 represents the file management structure 700 of a stub. In the case of the stub, the value of the is_stub field 704$x$ is "1", and the block_number field 706$x$ indicates the identification information for referring to the file data stored in the lower Tier, such as the path on the Tier 2 file system 201. Here, a path 716 is shown as an example. A file management structure number field 707$x$ stores a value corresponding to the file management structure number in the corresponding table 1600 shown in FIG. 16. The file management structure 700 may further include the owner, mode, and other attributes of the file.

FIG. 16 shows the corresponding table 1600 between the file name and the corresponding file management structure 700 in the Tier 1 file system 200. A file name field 1611 stores the file name specified by the client 100. A file management structure number field 1612 stores the file management structure number of the corresponding file.

Figure 8:
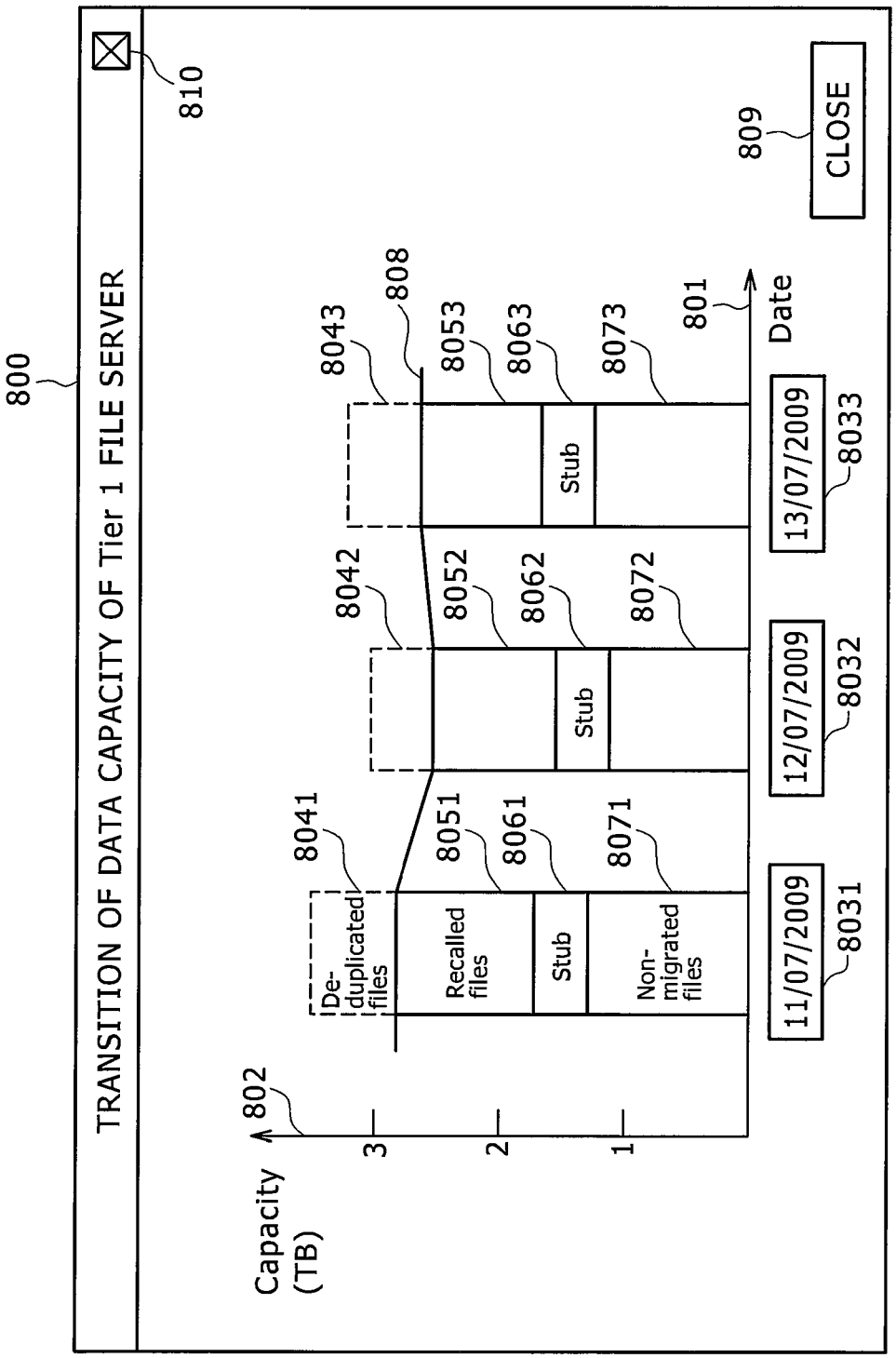
FIG. 8 is a diagram showing a GUI screen that presents the transition of the data capacity of the Tier 1 file server to an administrator according to an embodiment of the invention.

FIG. 8 shows an example of a GUI screen 800 that presents to the administrator the transition of the data capacity of the Tier 1 file server 102. The reporting processing module 308 of the Tier 1 file server 102 displays the GUI screen 800 in the management computer 101 through the LAN. Incidentally, the GUI screen 800 may be displayed for each user of the Tier 1 file server 102. Further, the screen 800 may be generated in a device other than the Tier 1 file server 102, but preferably is generated by the Tier 1 file server 102 corresponding to the upper Tier.

In the screen 800, an abscissa 801 of the graph represents the date while an ordinate 802 represents the capacity. Non-migrated files 807$x$ of each bar graph represent the total capacity of the files not migrated to the Tier 2 file server 103 yet, of the data stored in the Tier 1 file server 102. Stub 806$x$ represents the total capacity of the stubs migrated from the Tier 1 file server 102 to the Tier 2 file server 103. Recalled files 805$x$ represent the total capacity of the files recalled by the Tier 1 file server 102, of the data migrated from the Tier 1 file server 102 to the Tier 2 file server 103. There is also file system management information (not shown) for managing the file management structures and empty blocks.

De-duplicated files 804$x$ indicated by the dashed line represent the total capacity of the files that the client 100 has requested to access, of the files migrated from the Tier 1 file server 102 to the Tier 2 file server 103, and that the Tier 1 file server 102 used to respond to the client 100 without the need of the recall process due to duplicate files found in the Tier 1 file system 200. In other words, the capacity of the de-duplicated files 804$x$ represents the amount of the reduced capacity consumption of the Tier 1 file server 102 due to the fact that the recall process can be eliminated, compared to a system to which the present embodiment is not applied. Further, a line graph 808 shows the transition of the use capacity of the Tier 1 file system 200.

Date button 803$x$ indicates the date of each data. The administrator can press the date button 803$x$ to move to a screen 900 displaying the statistic information corresponding to each date. In this embodiment, although the date is used as an indicator of the abscissa, it is also possible to display the statistic information before/after various events detected by the Tier 1 file server 102, such as migration process, de-duplication process, and failure. Reference numerals 809 and 810 denote buttons for closing the screen 800.

Thanks to the screen 800, the administrator can grasp the transition of the capacity of the Tier 1 file system 200. For example, the administrator can see from the screen 800 that there are many access requests to a migrated file, and can use the information to reconfigure the migration conditions. Further, for example, the administrator can confirm that the capacity of the Tier 1 file system 200 is reduced due to the presence of the duplicate file information and the duplicate files in the Tier 1 file system 200.

Figure 9:
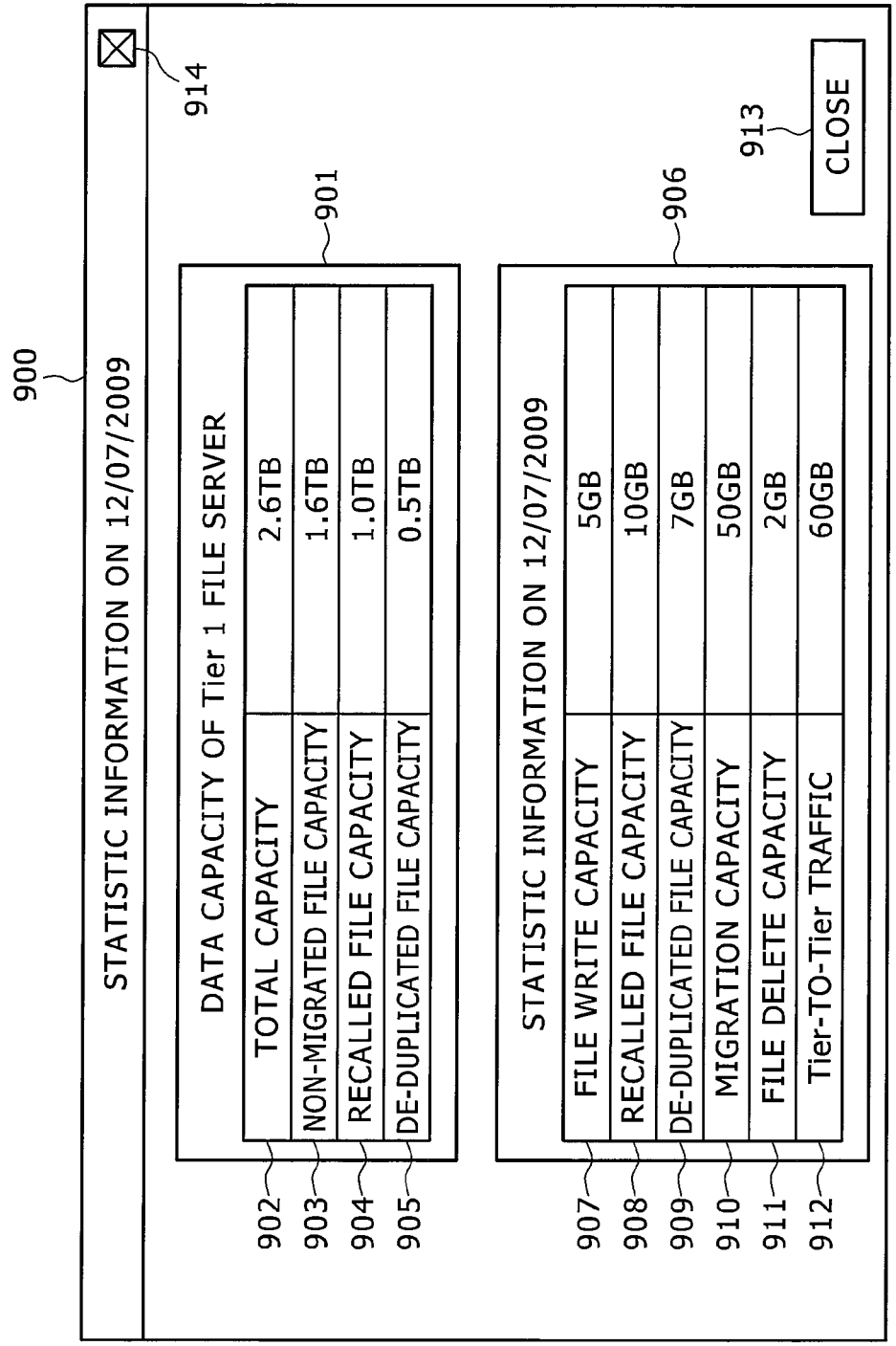
FIG. 9 is a diagram showing a GUI screen that presents strategic information of the Tier 1 file server for each date to the administrator according to an embodiment of the invention.

FIG. 9 shows an example of the GUI screen 900 presenting to the administrator the statistic information of the Tier 1 file server 102 for each date. The reporting processing module 308 of the Tier 1 file server 102 displays the screen 900 in the management computer 101 through the LAN. A data capacity 901 of the Tier 1 file server 102 includes a total capacity 902 of the Tier 1 file system 200 on a date specified by the administrator, as well as non-migrated file capacity 903, recalled file capacity 904, and de-duplicated file capacity 905. FIG. 9 shows the data capacity of the Tier 1 file server 102 on Jul. 12, 2009, in which the non-migrated file capacity 903 indicates the value of non-migrated files 8072 of FIG. 8 in byte units. The recalled file capacity 904 indicates the value of recalled files 8052 of FIG. 8 in byte units. The de-duplicated file capacity 905 indicates the value of de-duplicated files 8042 of FIG. 8 in byte units. The total capacity 902 indicates the value on Jul. 12, 2009 of the line graph of FIG. 8 in byte units.

The statistic information 906 indicates the statistic information of the Tier 1 file server 102 per day on the date specified by the administrator. A file write capacity 907 indicates the total amount of the data size of the written files per day in byte units. A recalled file capacity 908 indicates the total amount of the data size of the recalled files per day in byte units. A de-duplicated file capacity 909 indicates the total amount of the reduced data size in byte units because the recall process can be eliminated due to the presence of the duplicated files in the Tier 1 file system 200, compared to the system to which the present invention is not applied. A migration capacity 910 indicates the total amount of the data size of the files migrated from the Tier 1 file server 102 to the Tier 2 file server 103 per day in byte units. A deleted file capacity 911 indicates the total amount of the data size of the deleted files per day in byte units. A Tier-to-Tier traffic 912 indicates the total amount of the transferred data size between the Tier 1 file server 102 and the Tier 2 file server 103 through the LAN 105 by the migration process and the recall process per day in byte units. Reference numerals 913 and 914 denote buttons for closing the screen 900.

FIGS. 8 and 9 show the different GUI screens of the Tier 1 file server 102. The Tier 2 file server 103 can provides the same screens as those in FIGS. 8 and 9, to the administrator with respect to the Tier 2 file server 103. More specifically, the total file capacity of the Tier 2 file server 103 is classified into two major types: (a) the capacity of the de-duplicated files, in each of which only one file is stored as real data; and (b) the capacity of the non-de-duplicated files. Further, (a) includes (a-1) the capacity of the recalled files of the de-duplicated files, and (a-2) the capacity of the non-recalled files of the de-duplicated files. Also, (b) includes (b-1) the capacity of the recalled files of the non-de-duplicated files, and (b-2) the capacity of the non-recalled files of the non-de-duplicated files. Here, the total capacity of the Tier 2 file server 103 can be represented by (a-1), (a-2), (b-1), and (b-2), as well as the file system management information for managing the file management structures and empty blocks. From the capacity of (a-2) of those representing the total capacity of the Tier 2 file server 103, the administrator can see the capacity of the files whose recall processes can be eliminated.

Figure 10:
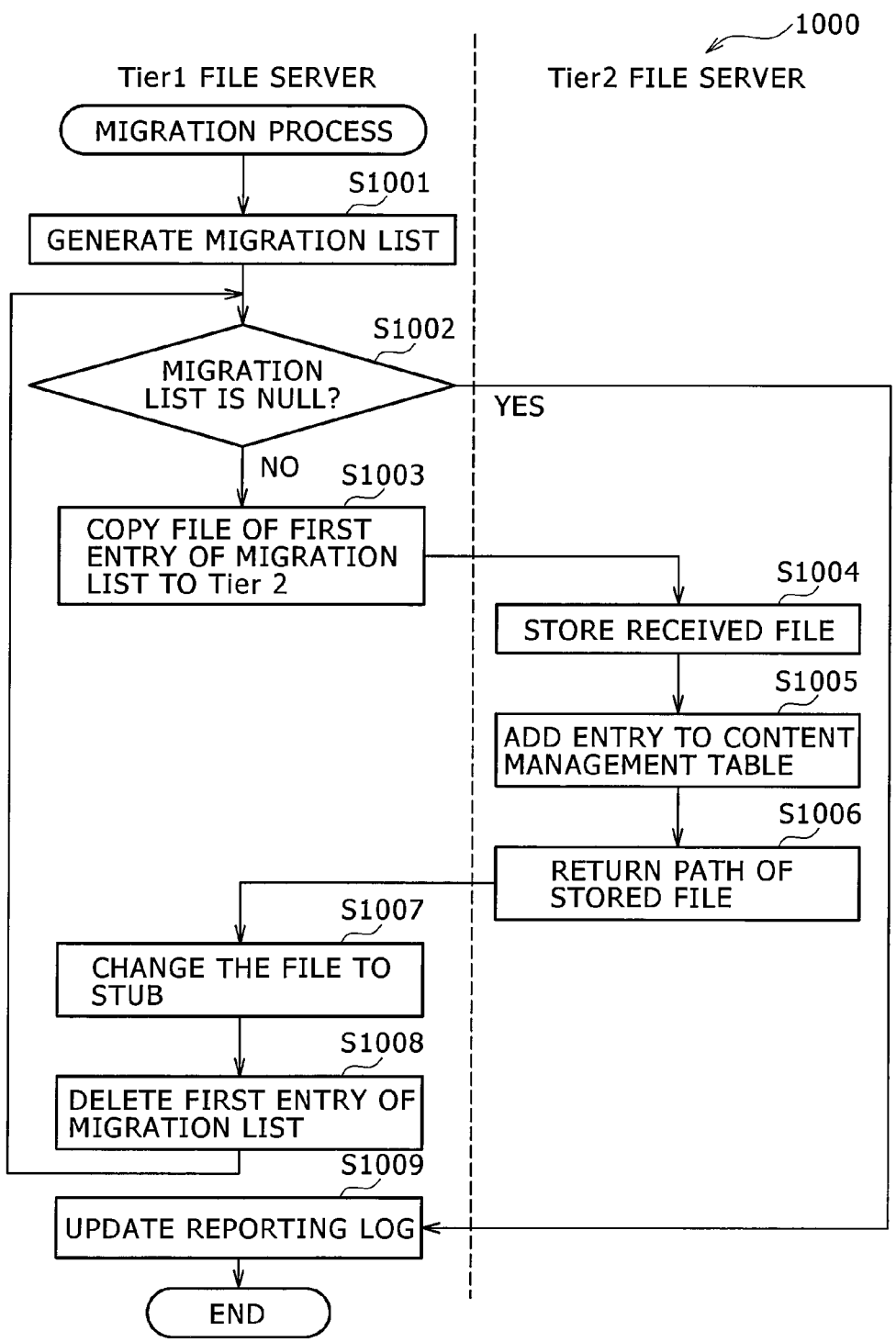
FIG. 10 is a flowchart showing the migration process by a migration processing module of the Tier 1 file server and by a content management processing module of the Tier 2 file server according to an embodiment of the invention.

FIG. 10 is a flowchart showing the migration process by the migration processing module 305 of the Tier 1 file server 102 and by the content management processing module 403 of the Tier 2 file server 103. The migration process is a process that is called by the OS based on the migration cycle timing set by the administrator, migrating files satisfying the migration conditions set by the administrator, which will be described later, of the files stored in the Tier 1 file server 102, to the Tier 2 file server 103.

The process shown in FIG. 10 will be described below according to the step numbers.
(Step S1001) The migration processing module 305 of the Tier 1 file server 102 searches the files stored in the Tier 1 file system 200, and generates a migration list. The migration list includes entries of files satisfying the migration conditions set by the administrator.
(Step S1002) The migration processing module 305 determines whether the migration list is empty (NULL). When the migration list is empty (step S1002: YES), the process moves to step S1009.
(Step S1003) On the other hand, when the migration list is not empty (step S1002: NO), the migration processing module 305 copies the file of the first entry of the migration list to the Tier 2 file server 103.
(Step S1004) The content management processing module 403 of the Tier 2 file server 103 stores the file received from the Tier 1 file server 102.
(Step S1005) The content management processing module 403 adds an entry of the file stored in step S1004 to the content management table 500. At this time, the content management processing module 403 assigns the content ID 501 to the specific file.
(Step S1006) The content management processing module 403 returns the path of the stored file to the Tier 1 file server 102.
(Step S1007) The migration processing module 305 of the Tier 1 file server 102 changes the specific file into a stub. At this time, the migration processing module 305 stores the file path returned from the Tier 2 file server 103 in step S1006, to the block_number field 706$x$ of the file management structure 700 of the specific file, and sets the is_stub field 704$x$ to "1".
(Step S1008) The migration processing module 305 deletes the first entry of the migration list. Then, the process moves to Step S1002.
(Step S1009) The reporting processing module 308 of the Tier 1 file server 102 updates the reporting log 309, and ends a series of migration processes. The reporting log 309 stores the list of the migrated files, the number of files, the file size, the dates and times when the files were migrated, and the like.

In this embodiment, the migration process by the migration processing module 305 is called by the OS based on the migration cycle timing set of the administrator. However, it is also possible that when a file satisfying the migration conditions is found, the migration process is performed on the file.

In FIG. 10, the migration processing module 305 of the Tier 1 file server 102 generates the migration list in step S1001, but the timing of generating the migration list is not limited to the above timing.

The migration conditions are set by the administrator using AND or OR, for example, in terms of the owner of the file, the date and time of generating the file, the last update date and time of the file, the last access date and time of the file, the file size, the file type, the presence or absence of Write Once Read Many (WORM) setting, and the presence or absence of retention setting as well as the period thereof. The migration conditions can be set for the whole Tier 1 file system 200, or for each specific directory or file. Incidentally, when a file is stored in the Tier 1 file server 102 by a recall process from the Tier 2 file server 103, and when an update occurs in the data file, the file is the target of the migration process again. In this case, the migration processing module 305 determines whether to migrate the recalled file by the following methods. For example, there is a method for managing the files by a field storing "written or unwritten after recall" in the file management structure 700. There is another method that provides a field storing "recall date and time" in the file management structure 700, comparing the recall date and time of the file with the last update date and time of the file stored in the file management structure 700. There is still another method that, when there is a write request to the recalled file, performs a migration process upon completion of the response to the write request.

FIG. 10 shows an example in which migration is performed on the file from the first entry of the migration list in the migration process. However, the same can be achieved in the case when the migration is performed on the file from the last entry of the migration list.

The fingerprint 502 can be generated and stored in the content management table 500 in step S1005 of FIG. 10 or in step S1503 of FIG. 15 that will be described below.

There may be a case in which the recall process by the recall processing module 306, which will be described below, is called by the file operation processing module 304 during the execution of the migration process by the migration processing module 306. At this time, the OS stops the execution of the migration process, and moves the process to the recall process. After the recall process is completed by the recall processing module 306, the OS restarts the migration process by the migration processing module 305. Similarly, with respect to the file read process, the file write process, and the file delete process, which will be described below, when these processes are called by the file operation processing module 304 during the execution of the migration process by the migration processing module 305, the OS stops the execution of the migration process, and moves the process to each of the processes. After the completion of each process, the OS restarts the migration process by the migration processing module 305.

Figure 11:
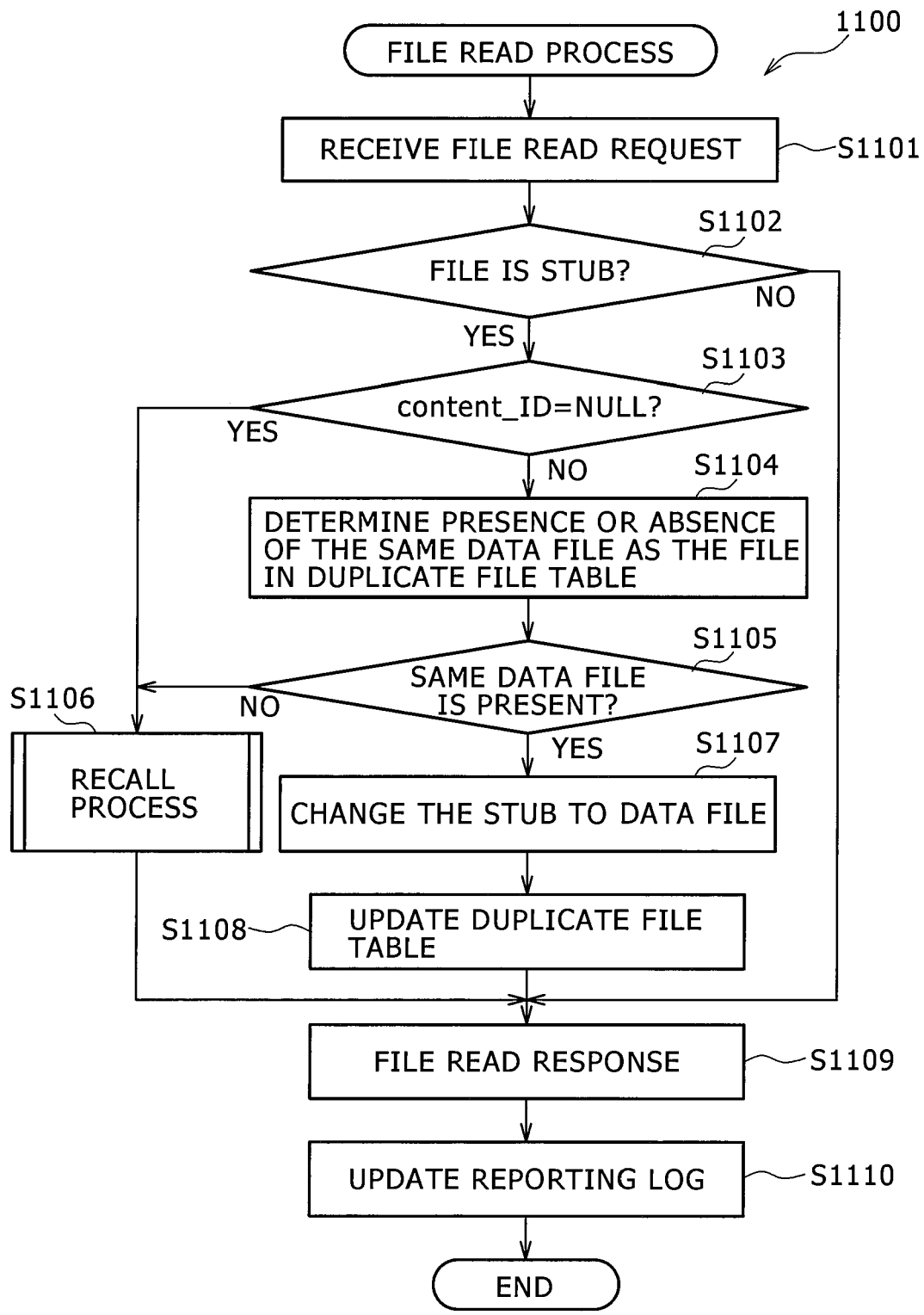
FIG. 11 is a flowchart showing the file read process by a file operation processing module of the Tier 1 file server according to an embodiment of the invention.

FIG. 11 is a flowchart showing the file read process by the file operation processing module 304 of the Tier 1 file server 102. A file read request from the client 100 specifies the identification information such as the file name and the path, and is passed to the file operation processing module 304 through the file sharing server program of the Tier 1 file server 102. Here, the file read request may be one command request, or may be a request by a communication divided into a plurality of sessions. The file read process is a process that the file operation processing module 304 identifies the target file of the read request, reads the identified file from the file system, and responds to the client 100. When the target file of the read request is a data file, the file is read from the Tier 1 file system 200. When the target file of the read request is a stub, a recall process is performed as described below.

The process shown in FIG. 11 will be described below according to the step numbers.

(Step S1101) The file operation processing module 304 of the Tier 1 file server 102 receives a file read request from the client 100.

(Step S1102) The file operation processing module 304 determines whether the target file of the read request is a stub. When the target file of the read request is not a stub (step S1102: NO), the process moves to step S1109.

(Step S1103) On the other hand, when the target file of the read request is a stub (step S1102: YES), the file operation processing module 304 determines whether the content_ID field 705x of the file management structure 700 of the target file of the read request is NULL. When the content_ID field 705x of the file management structure 700 of the target file of the read request is NULL (step S1103: YES), the process moves to step S1106. Here, when the content_ID field 705x is NULL (step S1103: YES), the duplicate file information of the specific file is not registered in the duplicate file table 600 in the Tier 1 file server 102.

(Step S1104) When the content_ID field 705x of the file management structure 700 of the target file of the read request is not NULL (step S1103: NO), the file operation processing module 304 determines whether there is an entry of the same data file as the specific file (an entry of the same content ID 601 with the stub flag 603 "0") in the duplicate file table 600.

(Step S1105) As a result of step S1104, when there is no entry of the same data file as the specific file in the duplicate file table 600 (step S1105: NO), the process moves to step S1106. On the other hand, when there is an entry of the same data file as the specific file in the duplicate file table 600 (step S1105: YES), the process moves to step S1107.

(Step S1106) The file operation processing module 304 asks the recall processing module 306 to perform a recall process on the specific file. Then, the process moves to step S1109.

(Step S1107) The file operation processing module 304 changes the stub into a data file. At this time, the file operation processing module 304 obtains the value of the block_number field 706x of the file management structure 700 of the same data file as the specific file, and stores the value in the block_number field 706x of the file management structure 700 of the specific file. In this way, a plurality of files share the same data block without a need to copy the data block storing the file data. Then, the file operation processing module 304 sets "0" to the is_stub field 704x of the file management structure 700 of the specific file.

(Step S1108) The file operation processing module 304 changes the is_stub field 704x of the specific file entry of the de-duplicate file table 600 to "0".

(Step S1109) The file operation processing module 304 returns the response of the file read to the client 100.

(Step S1110) The reporting processing module 308 of the Tier 1 file server 102 updates the reporting log 309, and ends a series of file read processes. The reporting log 309 stores the list of read files, number of files, file size, dates and times when the files were read, and the like.

In FIG. 11, the file operation processing module 304 refers to the data block in step S1107, by obtaining the value of the block_number field 706x of the file management structure 700 of the same data file as the specific file, and by storing the obtained value in the block_number field 706x of the file management structure 700 of the specific file. However, the file operation processing module 304 may change the stub to the data file by copying the data block of the same data file as the specific file.

Figure 12:
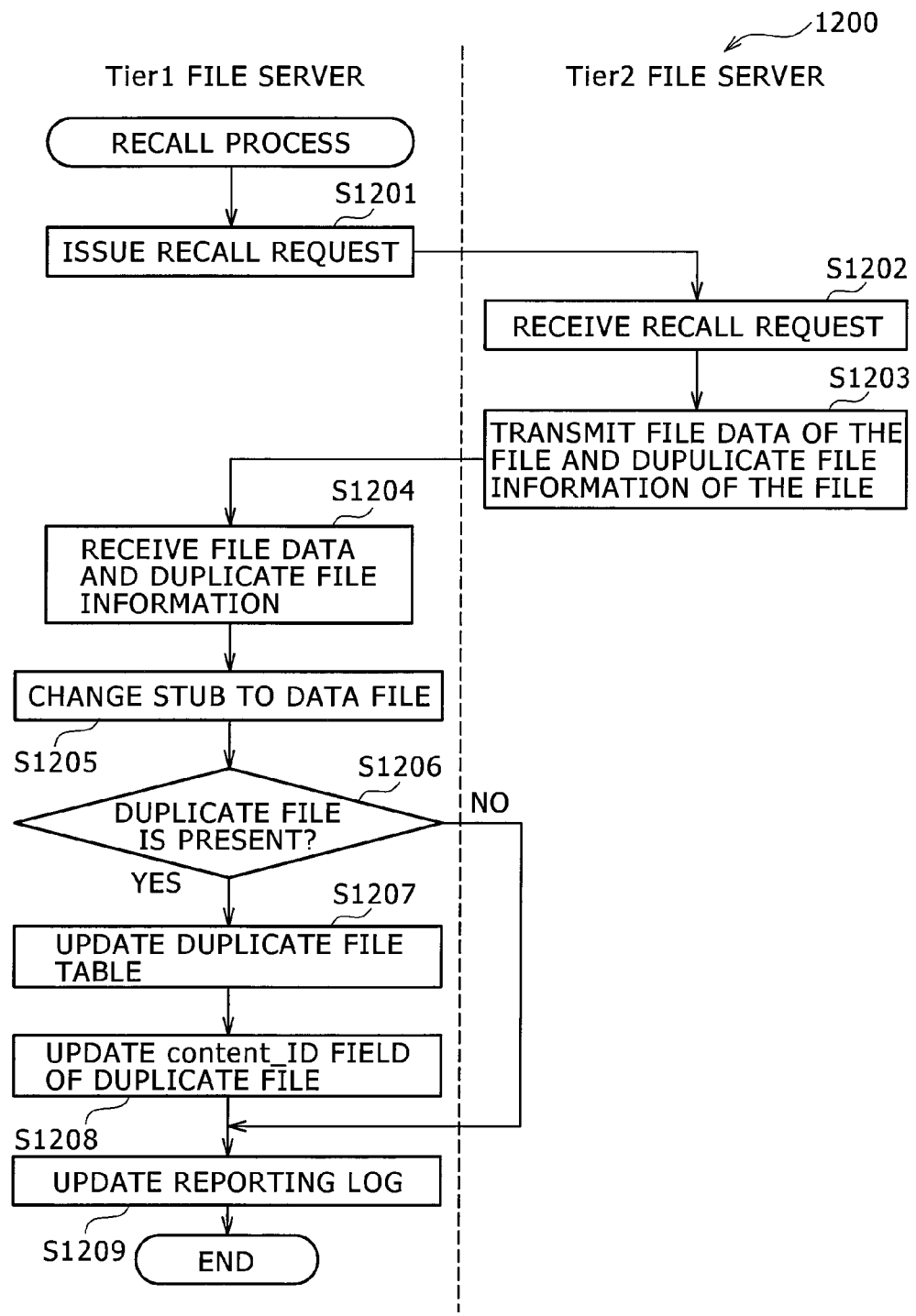
FIG. 12 is a flowchart showing the recall process by a recall processing module of the Tier 1 file server, and by the content management processing module and duplicate file information transfer processing module of the Tier 2 file server according to an embodiment of the invention.

FIG. 12 is a flowchart showing the recall process. The recall process is a process corresponding to the processes in step S1106 of FIG. 11 and in step S1306 of FIG. 13. The recall process is a process called by the file operation processing module 304 of the Tier 1 file server 102, receives the file data of the target file of a recall request from the Tier 2 file server 103, and returns the stub to the data file. For the recall process, two methods can be considered. One is a method of keeping the data file also in the Tier 2 file server 103, and the other is a method of deleting the data file from the Tier 2 file server 103. In this embodiment, the method of keeping the data file also in the Tier 2 file server 103 is used. When data files are kept also in the Tier 2 file server 103, the files are more likely to be identical to each other in the Tier 2 file server 103. As a result, when the data file is not updated after the recall process, it is possible to prevent the migration process from occurring again, thereby reducing the traffic between the hierarchies.

The process shown in FIG. 12 will be described below according to the step numbers.

(Step S1201) The recall processing module 306 of the Tier 1 file server 102 issues a recall request to the Tier 2 file server 103, with respect to the target file of a file read request or a file write request. The packet of the recall request includes the IP address of the Tier 1 file server 102 which is the source of the recall request, the IP address of the Tier 2 file server 103 which is the destination of the recall request, and the information for identifying the target file of the recall request. The information for identifying the target file of the recall request may be the file path stored in the block_number field 706x of the file management structure 700 in step S1007 of FIG. 10, or may be the content ID 501 stored in the content_ID field 705x of the file management structure 700 in step S1205 of FIG. 12.

(Step S1202) The Tier 2 file server 103 receives the recall request from the Tier 1 file server 102.

(Step S1203) The content management processing module 403 of the Tier 2 file server 103 transmits the file data that the Tier 1 file server 102 has requested to be recalled, to the Tier 1 file server 102. At the same time, the content management processing module 403 obtains the duplicate file information of the specific file from the content management table 500. Then, the duplicate file information transfer processing module 406 transmits the duplicate file information to the Tier 1 file server 102. The duplicate file information includes the content ID 501 of the specific file, and the file names (paths, and the like) of the files having the same content ID 501. The duplicate file information may also include the number of duplicate files and the fingerprint 502.

(Step S1204) The recall processing module 306 of the Tier 1 file server 102 receives the specific file data and the duplicate file information from the Tier 2 file server 103.

(Step S1205) The recall processing module 306 stores the specific file data received in step S1204 into the Tier 1 file system 200, and changes the stub to the data file. At this time, the recall processing module 306 changes the is_stub field 704x of the file management structure 700 of the specific file to "0". Then, the recall processing module 306 stores the content ID 501 of the specific file received in step S1204 into the content_ID field 705x of the file management structure 700 of the specific file.

(Step S1206) The recall processing module 306 determines whether duplicate file information is included in the data received in step S1204. When the duplicate file information is not included (step S1206: NO), the process moves to step S1209.

(Step S1207) On the other hand, when the duplicate file information is included (step S1206: YES), the recall processing module 306 generates entries of the received content ID 501 from the duplicate file information received in step S1204, and updates the duplicate file table 600. At this time, the recall processing module 306 sets the stub flag field 603 of the entry of the specific file to "0", and sets the stub flag field 603 of the entries of the other duplicate files to "1".

(Step S1208) The recall processing module 306 updates the content_ID field 705x of the management structure 700 of each duplicate file, based on the duplicate file information received in step S1204.

(Step S1209) The reporting processing module 308 of the Tier 1 file server 102 updates the reporting log 309, and ends a series of recall processes. The reporting log 309 stores the list of the recalled files, number of files, file size, and dates and times when the files were recalled, and the like.

Figure 13:
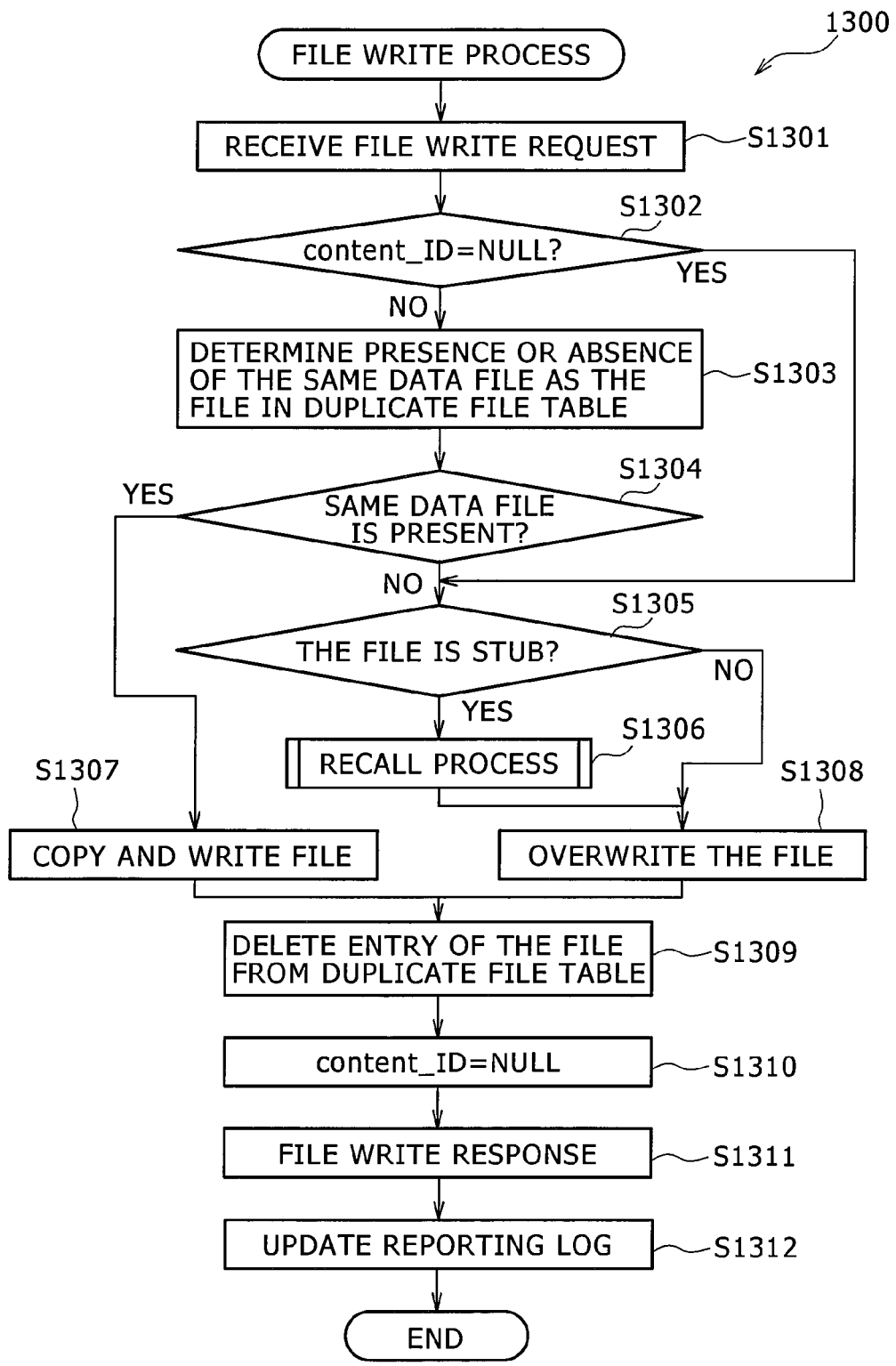
FIG. 13 is a flowchart showing the file write process by the file operation processing module of the Tier 1 file server according to an embodiment of the invention.

As described above, in this embodiment, the recall process is performed as the processes of Step S1106 of FIG. 11 and Step S1306 of FIG. 13. However, it is also possible to perform the recall process independently of the file read process and the file write process. For example, when the number of files identical to a certain file exceeds a predetermined value in the Tier 2 file server 103, it is determined that the specific file is likely to be accessed in the Tier 1 file server 102, so that the recall process may be performed with the duplicate file information.

FIG. 13 is a flowchart showing the file write process performed by the file operation processing module 304 of the Tier 1 file server 102. A file write request from the client 100 specifies the identification information such as the file name and the path, and is passed to the file operation process through the file sharing server program of the Tier 1 file server 102. The file write process is a process that the file operation processing module 304 performs a write process on the target file of the write request and responds to the client 100. Incidentally, the file write request may be one command request or may be a request by a communication divided into a plurality of sessions.

The process shown in FIG. 13 will be described below according to the step numbers.

(Step S1301) The file operation processing module 304 of the Tier 1 file server 102 receives a file write request from the client 100.

(Step S1302) The file operation processing module 304 determines whether the content_ID field 705x of the file management structure 700 of the target file of the write request is NULL. When the content_ID field 705x of the management structure 700 of the target file of the write request is NULL (step S1302: YES), the process moves to step S1305. Here, the content_ID field 705x value NULL (step S1302: YES) shows the state in which the duplicate file information of the specific file is not registered in the duplicate file table 600 in the Tier 1 file server 102.

(Step S1303) On the other hand, when the content_ID field 705x of the file management structure 700 of the target file of the write request is not NULL (step S1302: NO), the file operation processing module 304 determines whether there is an entry of the same data file as the specific file (an entry of the same content ID 601 with the stub flag 603 "0") in the duplicate file table 600.

(Step S1304) As a result of step S1303, when there is no entry of the same data file as the specific file in the duplicate file table 600 (step S1304: NO), the process moves to step S1305. On the other hand, when there is an entry of the same data file as the specific file in the duplicate file table 600 (step S1304: YES), the process moves to step S1307.

(Step S1305) The file operation processing module 304 determines whether the specific file is a stub. When the specific file is not a stub (step S1305: NO), the process moves to step S1308.

(Step S1306) When the specific file is a stub (step S1305: YES), the file operation processing module 304 asks the recall processing module 306 to perform a recall process on the specific file. Then, the process moves to step S1308.

(Step S1307) The file operation processing module 304 copies the data block of the duplicate file of the specific file, and then writes the write data. Then, the process moves to step S1309.

(Step S1308) The file operation processing module 304 overwrites the specific file, and writes the write data. Then, the process moves to step S1309.

(Step S1309) The file operation processing module 304 deletes the entry of the specific file from the duplicate file table 600.

(Step S1310) The file operation processing module 304 sets the content_ID field 705x of the file management structure 700 of the specific file to NULL.

(Step S1311) The file operation processing module 304 returns the response of the file write to the client 100.

(Step S1312) The reporting processing module 308 of the Tier 1 file server 102 updates the reporting log 309, and ends a series of file write processes. The reporting log 309 includes the list of the written files, number of files, file size, dates and times when the files were written, and the like.

Figure 14:
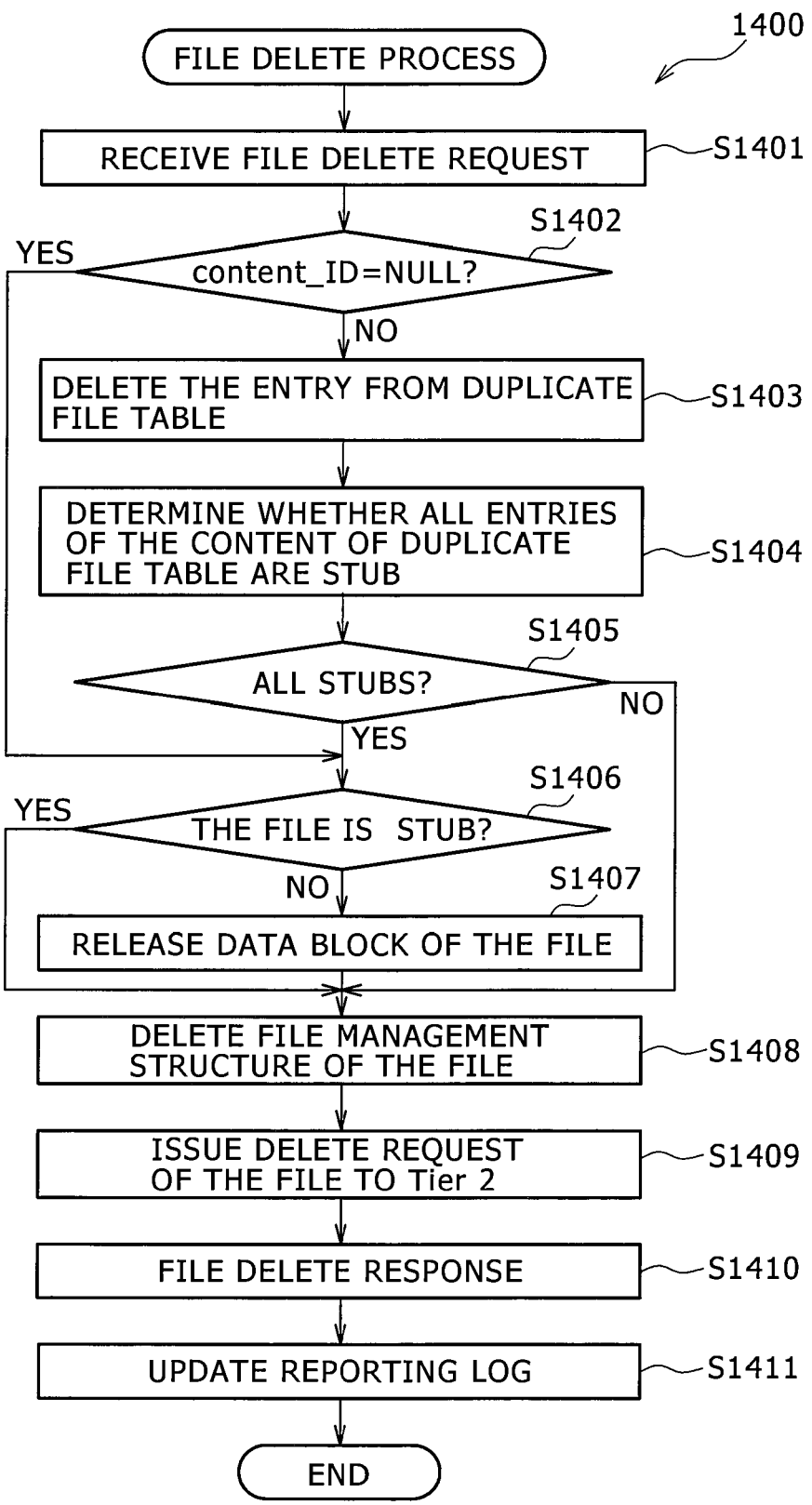
FIG. 14 is a flowchart showing the file delete process by the file operation processing module of the Tier 1 file server according to an embodiment of the invention.

FIG. 14 is a flowchart showing the file delete process performed by the file operation processing module 304 of the Tier 1 file server 102. A file delete request from the client 100 specifies the identification information such as the file name and the path, and is passed to the file operation processing module 304 through the file sharing server program of the Tier 1 file server 102. The file delete process is a process that the file operation processing module 304 performs a delete process on the target file of the delete request, and responds to the client 100.

The process shown in FIG. 14 will be described below according to the step numbers.

(Step S1401) The file operation processing module 304 of the Tier 1 file server 102 receives a file delete request from the client 100.

(Step S1402) The file operation processing module 304 determines whether the content_ID field 705x of the file management structure 700 of the target file of the delete request is NULL. When the content_ID field 705x of the file management structure 700 of the target file of the delete request is NULL (step S1402: YES), the process moves to step S1406.
(Step S1403) On the other hand, when the content_ID field 705*x* of the file management structure 700 of the target file of the delete request is not NULL (step S1402: NO), the file operation processing module 304 deletes the entry of the specific file from the duplicate file table 600.
(Step S1404) The file operation processing module 304 determines whether all entries of the specific content of the duplicate file table 600 are a stub (the stub flag field 603 is "1").
(Step S1405) As a result of step S1404, when all the entries of the specific content of the duplicate file table 600 are a stub (step S1405: YES), the process moves to step S1406. On the other hand, when all the entries of the specific content of the duplicate file table 600 are not a stub (step S1405: NO), the process moves to step S1408.
(Step S1406) The file operation processing module 304 determines whether the specific file is a stub. When the specific file is a stub (step S1406: YES), the process moves to step S1408.
(Step S1407) On the other hand, when the specific file is not a stub (step S1406: NO), the file operation processing module 304 release the data block of the specific file.
(Step S1408) The file operation processing module 304 deletes the file management structure 700 of the specific file.
(Step S1409) The file operation processing module 304 issues a delete request of the specific file to the Tier 2 file server 103.
(Step S1410) The file operation processing module 304 returns the response of the file deletion to the client 100.
(Step S1411) The reporting processing module 308 of the Tier 1 file server 102 updates the reporting log 309, and ends a series of file delete processes. The reporting log 309 stores the list of the deleted files, number of files, file size, dates and times when the files were deleted, and the like.

Although not shown in FIG. 14, when the Tier 2 file server 103 receives the delete request of the file issued by the Tier 1 file server 102 in step S1409, the content management processing module 403 deletes the entry of the specific file from the content management table 500. Further, the content management processing module 403 releases the data block if there is no file identical to the specific file.

Here, FIG. 14 will be described by the following specific examples of files (A) to (F). (A) When the target file of a delete request is a stub and has no duplicate file information, the results in S1402 and S1406 are positive, and the processes of S1408 to S1411 are performed. (B) The target file of a delete request is a stub and has the duplicate file information, and all the duplicate files other than the target file are also stubs. In this case, the result in S1402 is negative while the results in S1405 and S1406 are positive, and the processes of S1408 to S1411 are performed. (C) The target file of a delete request is a stub and has the duplicate file information, and a data file is included in the duplicate files other than the target file in the Tier 1 file server 102. In this case, the results in S1402 and S1405 are negative, and the processes of S1408 to S1411 are performed.
(D) The target file of a delete request is a data file and has no duplicate file information (for example, the file is not migrated, or the file is migrated and recalled but has no duplicate file). In this case, the result in S1402 is positive while the result in S1406 is negative, and the processes of S1407 to S1411 are performed. Here, when the target file of the delete request is not migrated, the process of S1409 is skipped. (E) The target file of a delete request is a data file and has the duplicate file information, and all the duplicate files other than the target file are stubs (for example, the file is recalled but does not share the data block with the other duplicate files). In this case, the result in S1402 is negative, the result in S1405 is positive, and the result in S1406 is negative, and the processes of S1407 to S1411 are performed.
(F) The target file of a delete request is a data file and has the duplicate file information, and a data file is included in the duplicate files other than the target file in the Tier 1 file server 102 (for example, the file is recalled and shares the data block with the other duplicate files). In this case, the results in S1402 and S1405 are negative, and the processes of S1408 to S1411 are performed.

Figure 15:
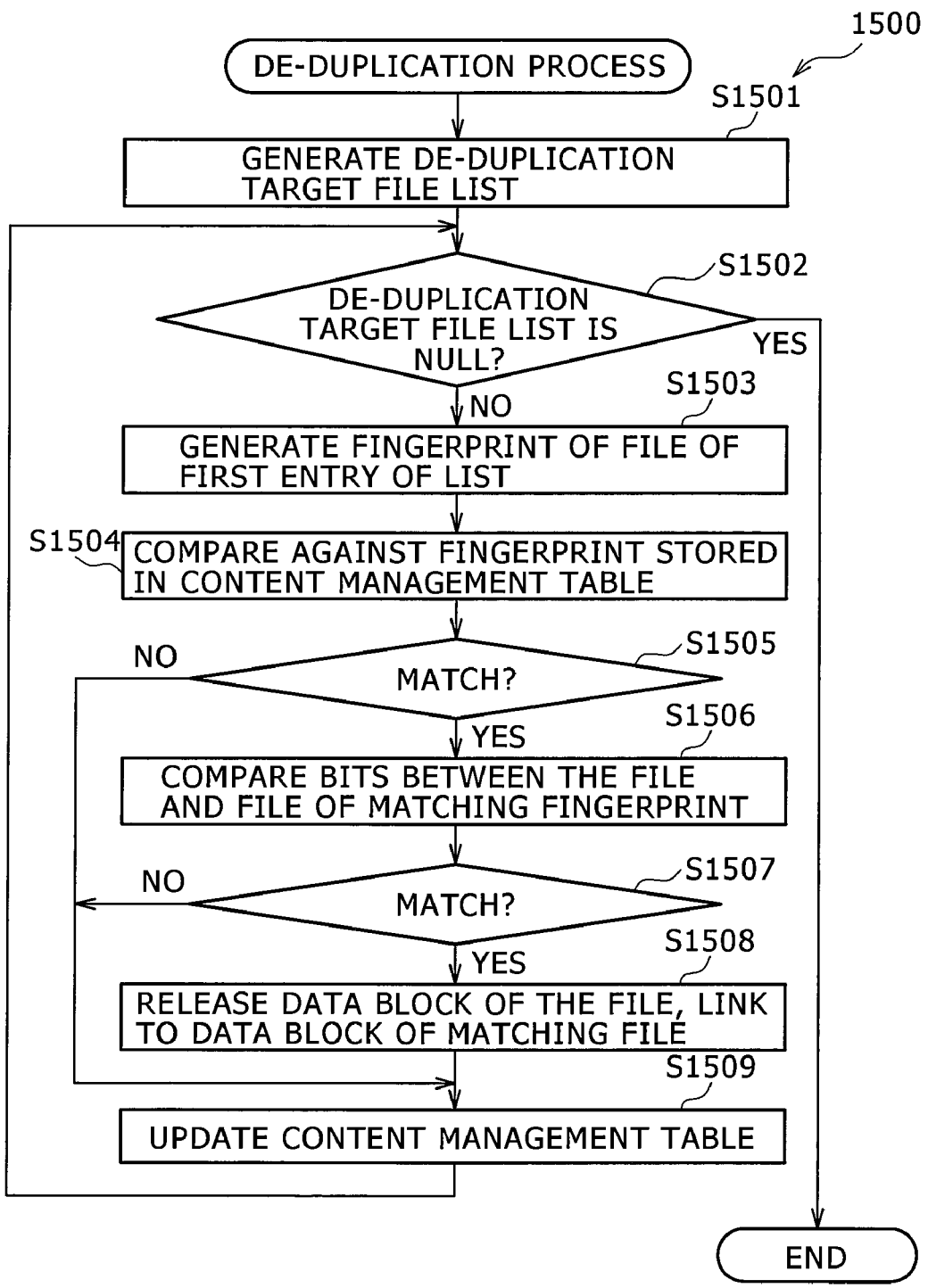
FIG. 15 is a flowchart showing the de-duplication process by a de-duplication processing module of the Tier 2 file server according to an embodiment of the invention.

FIG. 15 is a flowchart showing the de-duplication process by the de-duplication processing module 405 of the Tier 2 file server 103. The de-duplication process is a process called by a timer of the OS on a regular basis, and performs de-duplication on the file stored in the Tier 2 file system 201 at file level.

The process shown in FIG. 15 will be described below according to the step numbers.
(Step S1501) The de-duplication processing module 405 of the Tier 2 file server 103 generates a de-duplication target file list. The de-duplication target file list stores entries of files to be subject to the de-duplication process.
(Step S1502) The de-duplication processing module 405 determines whether the de-duplication target file list is empty. When the de-duplication target file list is empty (step S1502: YES), the de-duplication processing module 405 ends the de-duplication process.
(Step S1503) On the other hand, when the de-duplication target file list is not empty (step S1502: NO), the de-duplication processing module 405 generates a fingerprint of the file of the first entry of the de-duplication target file list.
(Step S1504) The de-duplication processing module 405 compares the fingerprint generated in step S1503 against the fingerprints 502 stored in the content management table 500, to find the matching fingerprint 502.
(Step S1505) As a result of step S1504, when the matching fingerprint 502 is not found (step S1505: NO), the process moves to step S1509.
(Step S1506) On the other hand, when the matching fingerprint 502 is found (step S1505: YES), the de-duplication processing module 405 compares the data bits between the specific file and the file of the matching fingerprint 502.
(Step S1507) As a result of step S1506, when the data do not match with each other (step S1507: NO), the process moves to step S1509.
(Step S1508) On the other hand, when the two data match as a result of step S1506 (step S1507: YES), the de-duplication processing module 405 releases the data block of the specific file, and links to the data block of the file of the matching data.
(Step S1509) The de-duplication processing module 405 reflects the de-duplication result to the content management table 500. More specifically, when the results of step S1505 and step S1507 are negative, the de-duplication processing module 405 provides a new content ID 501 to the specific file, stores the value in the fingerprint 502 and in the file group 503, and registers the data in the content management table 500. When the result in step S1507 is positive, the de-duplication processing module 405 adds the file name of the specific file to the file group 503 corresponding to the same content ID 501 as the specific file. Then, the de-duplication processing module 405 deletes the entry of the content ID 501 corresponding only to the specific file, from the content management table 500.

In this embodiment, the de-duplication process of the Tier 2 file server 103 is performed in background on a regular basis. However, the present invention is also applicable to the case in which the de-duplication process is performed at the time when the file is stored in the Tier 2 file system 201.

Further, it is also possible to perform the de-duplication process when the remaining storage capacity of the Tier 2 file server 103 is reduced to a predetermined value or less.

Although FIG. 15 shows that the fingerprint of the file is generated in step S1503, the timing of generating the fingerprint is not limited to the above timing. For example, it is possible to generate a fingerprint of a file at the time when the file is stored in the Tier 2 file system 201 by the migration process (step S1005 of FIG. 10).

FIG. 15 shows an example in which de-duplication is performed on the file from the first entry of the de-duplication target file list in the de-duplication process. However, the same can be achieved when de-duplication is performed on the file from the last entry of the de-duplication target file list.

As described above, in the first embodiment, the Tier 2 file server 103 transfers the duplicate file information held by the content management table 500 of the Tier 2 file server 103, to the Tier 1 file server 102 in the recall process. The Tier 1 file server 102 stores the received duplicate file information into the duplicate file table 600 of the Tier 1 file server 102.

When there is an access to the migrated file, the Tier 1 file server 102 determines whether a duplicate file is stored in the Tier 1 file system 200 based on the duplicate file information. When the duplicate file is stored in the Tier 1 file system 200, the Tier 1 file server 102 does not perform the recall process. As a result, the HSM system according to the present invention can reduce the number of recalls, leading to an improvement in the access time, a reduction in the capacity of the Tier 1 file system 200, and a reduction in the bandwidth consumption between the tiers.

Second Embodiment

Next, a second embodiment according to the present invention will be described. It is to be understood that the present embodiment does not limit the present invention.

The second embodiment is different from the first embodiment in the timing that the Tier 2 file server 103 transfers the duplicate file information held by the content management table 500, to the Tier 1 file server 102. In the second embodiment, the duplicate file information transfer processing module 406 of the Tier 2 file server 103 transfers the duplicate file information to the Tier 1 file server 102 at the time when the de-duplication processing module 405 of the Tier 2 file server 103 updates the content management table 500 in the process of step S1509. The Tier 1 file server 102 receives the duplicate file information from the Tier 2 file server 103, and stores the received duplicate file information into the duplicate file table 600.

The duplicate file information, which is transferred by the duplicate file information transfer processing module 406 to the Tier 1 file server 102, may include all the duplicate file information held by the content management table 500 of the Tier 2 file server 103, or may include the difference information that is changed from the last transferred information.

The second embodiment is the same as the first embodiment, except for the method of the duplicate file information transfer process by the duplicate file information transfer processing module 406 of the Tier 2 file server 103. Thus, the same effect as that of the first embodiment can be obtained.

In addition, differently from the first embodiment, the second embodiment can update the duplicate file table 600 in the Tier 1 file server 102 prior to the recall process on one file after the migration process is performed on a certain group of duplicate files. Thus, the effect of reducing the recall process is large.

As described above, in the second embodiment, the Tier 2 file server 103 transfers the duplicate file information to the Tier 1 file server 102 upon the completion of the de-duplication process. The Tier 1 file server 102 receives the duplicate file information, and stores the received duplicate file information into the duplicate file table 600. In this way, when there is an access to the stub file, the Tier 1 file server 102 determines the presence or absence of a duplicate file in the Tier 1 file server 102 by referring to the duplicate file table 600. When the duplicate file is present, it is possible to reduce the recall process.

Third Embodiment

Next, a third embodiment according to the present invention will be described. It is to be understood that the present embodiment does not limit the present invention. The third embodiment is different from the first and second embodiments in the timing that the Tier 2 file server 103 transfers the duplicate file information held by the content management table 500 of the Tier 2 file server 103, to the Tier 1 file server 102.

In the third embodiment, the duplicate file information transfer process by the duplicate file information transfer processing module 406 is called by the OS based on the cycle timing set by the administrator. The duplicate file information transfer processing module 406 transfers the duplicate file information held by the content management table 500 of the Tier 2 file server 103, to the Tier 1 file server 102. The Tier 1 file server 102 receives the duplicate file information from the Tier 2 file server 103, and stores the received duplicate file information into the duplicate file table 600.

The duplicate file information transferred to the Tier 1 file server 102 from the duplicate file information transfer processing module 406, may include all the duplicate file information held by the content management table 500 of the Tier 2 file server 103, or may include the difference information that is changed from the last transferred information.

The third embodiment is the same as the first and second embodiments, except for the method of the duplicate file information transfer process performed by the duplicate file information transfer processing module 406 of the Tier 2 file server 103. Thus, the same effect as those of the first and second embodiments can be obtained.

As described above, in the third embodiment, the duplicate file transfer process of the Tier 2 file server 103 is called by the OS on a regular basis. Then, the duplicate file information transfer processing module 406 transfers the duplicate file information to the Tier 1 file server 102. According to the third embodiment, for example, the administrator can set the timing of transferring the duplicate file information, to a time when the process load of the Tier 1 file server 102 and the Tier 2 file server 103 is small, or to a time when the transfer load between the hierarchies is small. In this way, it is possible to reduce the bandwidth consumption between the tiers. Further, it is also possible in the Tier 1 file server 102 to reduce the influence on the file access process from the client as well as on the recall process.

Fourth Embodiment

Next, a fourth embodiment according to the present invention will be described. It is to be understood that the present embodiment does not limit the present invention. The fourth embodiment is different from the first, second, and third embodiments in that the Tier 1 file server 102 does not include the duplicate file table 600.

In the fourth embodiment, when there is an access to a stub file, the file operation processing module 304 of the Tier 1 file server 102 inquires the Tier 2 file server 103 about the presence of a duplicate file of the specific file. Upon receiving the inquiry from the Tier 1 file server 102, the Tier 2 file server 103 refers to the content management table 500 to determine the presence or absence of a file identical to the specific file. When the file identical to the specific file is present, the Tier 2 file server 103 returns the file name (path) of the duplicate file as a response to the Tier 1 file server 102. When a plurality of files are identical to the specific file, the Tier 2 file server 103 returns a plurality of file names (paths) to the Tier 1 file server 102 as a response to the inquiry. On the other hand, when the file identical to the specific file is not present, the Tier 2 file server 103 returns the file data of the specific file to the Tier 1 file server 102 as a response to the inquiry.

Upon receiving the file names (paths) of the duplicate files of the specific file, the Tier 1 file server 102 identifies the file management structures 700 corresponding to the received file names (paths) of the duplicate file. Then, the Tier 1 file system 200 determines whether the duplicate files are stubs or data files. When all the files are stubs, the recall processing module 306 performs the recall process shown in FIG. 12, and asks the Tier 2 file server 103 for the file data. On the other hand, when the duplicate file is a data file, the file operation processing module 304 copies the block_number field 706x of the file management structure 700 of the duplicate file, to the block_number filed 706x of the file management structure 700 of the specific file. Then, the file operation processing module 304 refers to the data block of the file management structure 700 of the specific file, and changes the specific file from the stub to the data file.

As described above, in the fourth embodiment, when there is an access to the stub file, the Tier 1 file server 102 inquires the Tier 2 file server 103 about the presence or absence of a duplicate file of the specific file. In this way, it is possible to obtain the same effect as those of the first, second, and third embodiments, without a need to provide the duplicate file table 600 in the Tier 1 file server 102. Further, according to the fourth embodiment, the Tier 1 file server 102 does not include the duplicate file table, so that the storage capacity of the Tier 1 file server 102 is not consumed. In addition, it is possible to use the latest duplicate file information, so that the effect of reducing the number of recalls is large.

Fifth Embodiment

Next, a fifth embodiment according to the present invention will be described. It is to be understood that the present embodiment does not limit the present invention. In the fifth embodiment, it is assumed that there are two or more Tier 1 file servers 102 that can communicate with each other through a LAN.

In the fifth embodiment, the Tier 2 file server 103 prepares name spaces for a plurality of Tier 1 file servers 102, respectively, and manages all the migrated files by a single content management table. The de-duplication processing module 405 of the Tier 2 file server 103 performs the de-duplication process on all the files. Thus, when the file data of the files migrated from the different Tier 1 file servers 102 are identical to each other, the Tier 2 file server 103 assumes that the duplicate file data have the same content.

The duplicate file information transfer processing module 406 of the Tier 2 file server 103 can transfer the duplicate file information to a certain Tier 1 file server 102 (hereinafter referred to as file server A), together with the duplicate file information of another Tier 1 file server (hereinafter referred to as file server B). Upon receiving the duplicate file information of the file server B, the file server A can transfer the duplicate file information of the file sever B through a LAN connecting the file servers A and B. For example, when transferring the duplicate file information of file A-a of the file server A to the file server A, the Tier 2 file server 103 transfers a group of files having the same file data, namely, file A-a and file A-b of the file server A and file B-a and file B-b of the file server B. The file server A receives the group of files, and stores the information that the file A-a and the file A-b are duplicate files into the duplicate file table 600 of the file server A, while transferring the information that the file B-a and the file B-b are duplicate files, to the file server B. Upon receiving the information from the file server A, the file server B stores the received information indicating that the file B-a and the file B-b are duplicate files into the duplicate file table 600 of the file server B. In this way, the Tier 1 file server 102 can obtain the duplicate file information not only from the Tier 2 file server 103 but also from the other Tier 1 file server 102. According to the present embodiment, with a plurality of Tier 1 file servers 102, a certain Tier 1 file server 102 can receive the duplicate file information via the other Tier 1 file server 102, even if the transfer load between the certain Tier 1 file server 102 and the Tier 2 file server 103 is high and thus it is difficult to receive the duplicate file information from the Tier 2 file server 103.

Sixth Embodiment

Next, a sixth embodiment according to the present invention will be described. It is to be understood that the present embodiment does not limit the present invention. The sixth embodiment is different from the above embodiments in that the Tier 2 file server 103 includes a block level de-duplication function.

In the sixth embodiment, the Tier 2 file server 103 assigns a unique data block ID for each data block, and manages files referring to the data block for each data block. The Tier 2 file server 103 transfers the data block ID and the information of the file referring to the data block, to the Tier 1 file server 102. Upon receiving from the Tier 2 file server 103, the Tier 1 file server 102 stores the data block ID and the information of the file referring to the data block into a table.

When there is an access to a migrated file, the Tier 1 file server 102 refers to the table in which the data block ID and the information of the file referring to the data block are stored, and determines the presence or absence of a file referring to the same data block. When the file referring to the same data block is a data file, the data block can be shared. According to the present embodiment, when some of the data blocks of the file stored in the Tier 1 file server 102 can be shared, the Tier 1 file server 102 performs a recall process only on the rest of the data blocks. Thus, it is possible to reduce the capacity consumption of the Tier 1 file server 102 associated with the recall process, compared to the capacity consumption in the file level de-duplication. In addition, a high recall reduction effect can be obtained.

It is to be noted that the above described first to sixth embodiments can also be achieved by the Tier 1 file server by reading a program for executing the following steps: controlling access requests from the client 100, and storing files transmitted/received to/from the client 100 into the storage device connected to the file server; migrating a first file stored in the storage area to another file server, according to the access state from the client 100; receiving duplicate file information generated by the other file server by determining whether the migrated first file and other files are identical to each other; and when receiving a read request to the first file from the client 100, determining whether a second file identical to the first file is stored in the storage area based on the received duplicate file information, and when determining that the second file is stored, responding to the client 100 by using the second file.

Incidentally, the above embodiments use the identification information indicating the location of the file data within the Tier 2 file server 103, as a stub of the file stored in the Tier 2 file server 103. However, it is also possible to use an identifier corresponding to the data content. In this case, the information that the Tier 1 file server 102 holds as the stub in the file management structure 700 is not the identification information of the file such as the path name, but is the identifier corresponding to the data content. Then, when a certain file is recalled from the Tier 2 file server 103 to the Tier 1 file server 102 in response to an access request to the file, the Tier 1 file server 102 searches for a file other than the specific file that represents the data content corresponding to the specific file as a stub. When the other file is extracted as a result of the search, the stub of the specific file can be changed from representing the identifier corresponding to the data content within the Tier 2 file server 103, to representing the identifier of the file data recalled to the Tier 1 file server 102.

As described above, the present invention provides a function that the Tier 2 file server 103 transfers the duplicate file information held by the Tier 2 file server 103 to the Tier 1 file server 102, and that the Tier 1 file server 102 holds the duplicate file information. When there is an access to a migrated file, the Tier 1 file server 102 determines whether a duplicate file is stored in the Tier 1 file system 200 based on the duplicate file information. When the duplicate file is stored in the Tier 1 file system 200, the Tier 1 file server 102 responds to the client 100 without performing the recall process. Thus, according to the present invention, the HSM system can provide a large number of files to the client 100, while reducing the traffic of the recall process. Further, the upper Tier manages the information to prevent the recall process from being performed on the duplicated file, so that it is possible to reduce the consumption of the storage capacity of the upper Tier. In addition, as the upper Tier manages the information to prevent the recall process from being performed on the duplicate file, it is possible to reduce the bandwidth consumption between the tiers.

The present invention can be widely applied to file servers using the de-duplication function in the hierarchical storage management system.

This application claims priority from Japanese Patent Application 2009-225860, filed Sep. 30, 2009, which is incorporated herein by reference in its entirety.

What is claimed is:

1. A computer system comprising:
a first computer; and
a second computer,
wherein: the first computer includes a first storage area for storing files transmitted/received to/from a host computer;
the second computer includes a second storage area for storing files migrated from the first computer;
the first computer migrates first and second files stored in the first storage area, to the second computer, according to the access state from the host computer, and provides first and second file identifiers corresponding to the first and second files, respectively;
the second computer receives and stores the migrated first and second files in the second storage area;

the second computer determines whether the migrated first and second files are identical to each other, and when determining that the migrated first and second files are identical to each other, the second computer generates duplicate file information indicating that the first and second files are identical to each other;

the second computer transmits the generated duplicate file information to the first computer;

the first computer manages the first file identifier associated with the second file identifier, based on the duplicate file information;

when receiving a read request to the second file from the host computer, the first computer transmits an instruction asking the second computer to transfer the second file from the second computer;

the second computer transmits the second file to the first computer;

the first computer stores the received second file as a file corresponding to the second file identifier into the first storage area, and transmits the second file to the host computer; and when receiving a read request to the first file from the host computer, the first computer determines that the second file identical to the first file is stored in the first storage area, based on the duplicate file information and on the first and second file identifiers, and responds to the host computer by using the second file.

2. The computer system according to claim 1,
wherein the duplicate file information includes the first and second file identifiers, and an identifier corresponding to a group including the first and second files.

3. The computer system according to claim 1,
wherein the duplicate file information includes the first and second file identifiers, and an identifier corresponding to the data of the first and second files.

4. The computer system according to claim 1,
wherein, when determining that the second file identical to the first file is stored in the first storage area based on the duplicate file information and on the first and second file identifiers, the first computer prevents an instruction from asking the second computer to transfer the first file from the second computer.

5. The computer system according to claim 1,
wherein, when determining that the second file identical to the first file is not stored in the first storage area based on the duplicate file information and on the first and second file identifiers, the first computer transmits an instruction asking the second computer to transfer the first file from the second computer, and transmits the first file received from the second computer to the host computer.

6. The computer system according to claim 1,
wherein, when determining that the second file identical to the first file is stored in the storage area based on the duplicate file information and on the first and second file identifiers, the first computer retrieves the data of the second file to restore the first file, and transmits the restored first file to the host computer.

7. The computer system according to claim 1,
wherein the second computer transmits the duplicate file information to the first computer at a predetermined timing.

8. The computer system according to claim 1,
wherein, in response to request from the first computer, the second computer transmits the duplicate file information to the first computer.

9. The computer system according to claim 1,
wherein a first physical storage medium constituting the first storage area has a higher access performance than that of a second physical storage medium constituting the second storage area.

10. The computer system according to claim 1, further comprising a management computer connected to the first and second computers,
wherein: with respect to the files that the host computer has requested to access, the first computer manages the capacity of the second file as the capacity information of the file that the first computer received from the second computer and used to respond to the host computer, and manages the capacity of the first file as the capacity information of the file that the first computer stored in the first storage area and used to respond to the host computer without receiving from the second computer; and
the first computer transmits to the management computer the capacity information of the file transferred to the first computer from the second computer, as well as the capacity information of the file that the first computer stored in the first storage area and used to respond to the host computer without receiving from the second computer.

11. The computer system according to claim 1, wherein:
when transmitting the second file to the first computer, the second computer transmits the duplicate file information to the first computer.

12. A file controller connected to a host computer and another file controller, and further connected to a storage device constituting a storage area for storing files transmitted/received to/from the host computer,
the file controller comprising:
a processor for controlling access requests to the storage area from the host computer; and
a memory for storing a program executed by the processor,
wherein the processor performs the steps of:
migrating first and second files stored in the storage area to the other file controller according to the access state from the host computer, providing first and second file identifiers corresponding to the first and second files, respectively, and storing a management information in the memory;
when the duplicate file information is generated in the other file controller with respect to the migrated first and second files to indicate that the first and second files are identical to each other, receiving duplicate file information from the other file controller, and updating the management information associated with the first file identifier stored in the memory with the second file identifier;
when receiving a read request to the second file from the host computer, transmitting an instruction asking the other file controller to transfer the second file from the other file controller;
receiving the second file from the other file controller;
storing the received second file as the file corresponding to the second file identifier into the storage area, and transmitting the second file to the host computer; and
when receiving a read request to the first file from the host computer, determining that the second file identical to the first file is stored in the storage area based on the duplicate file information and on the first and second file identifiers, and responding to the host computer by using the second file.

13. The file controller according to claim 12,
wherein the duplicate file information includes the first and second file identifiers, as well as an identifier corresponding to the data of the first and second files.

14. The file controller according to claim 12,
wherein, when determining that the second file identical to the first file is stored in the storage area based on the duplicate file information and on the first and second file identifiers, the processor prevents an instruction from asking the other file controller to transfer the first file from the other file controller.

15. The file controller according to claim 12,
wherein, when determining that the second file identical to the first file is not stored in the storage area based on the duplicate file information and on the first and second file identifiers, the processor transmits to the other file controller an instruction asking it to transfer the first file from the other file controller, and transmits the first file received from the other file controller to the host computer.

16. The file controller according to claim 12,
wherein, when determining that the second file identical to the first file is stored in the storage area based on the duplicate file information and on the first and second file identifiers, the processor retrieves the data of the second file to restore the first file, and transmits the restored first file to the host computer.

17. The file controller according to claim 12,
wherein a first physical storage medium constituting the storage area has a higher access performance than that of a second physical storage medium constituting the storage area connected to the other file controller.

18. The file controller according to claim 12,
wherein: the file server is connected to a management computer;
with respect to the files that the host computer has requested to access, the processor manages the capacity of the second file as the capacity information of the file that the processor received from the other file controller and used to respond to the host computer, and manages the capacity of the first file as the capacity information of the file that the processor stored in the storage area and used to respond to the host computer without receiving from the other file controller; and
the processor transmits to the management computer the capacity information of the file transferred from the other file controller, as well as the capacity information of the file that the processor stored in the first storage and used to respond to the host computer without receiving from the other file controller.

19. The file controller according to claim 12,
wherein the processor further performs the step of:
when receiving the second file, receiving the duplicate file information from the other file controller.

20. A computer readable recording medium that records a program executed by a file server connected to a host computer and another file server, the recording medium comprising the steps of:
controlling access requests from the host computer, and storing files transmitted/received to/from the host computer into a storage device connected to the file server;
migrating first and second files stored in the storage device to the other file server according to the access state from the host computer;
providing first and second file identifiers corresponding to the first and second files, respectively, and storing a management information;

when the duplicate file information is generated in the other file server with respect to the migrated first and second files to indicate that the first and second files are identical to each other, receiving duplicate file information from the other file server, and updating the management information associated with the first file identifier with the second file identifier;

when receiving a read request to the second file from the host computer, transmitting an instruction, asking the other file server to transfer the second file from the other file server;

receiving the second file from the other file server;

storing the received second file as the file corresponding to the second file identifier into the storage device, and transmitting the second file to the host computer; and when receiving a read request to the first file form the host computer, determining that the second file identical to the first file is stored in the storage device based on the duplicate file information and on the first and second file identifiers, and responding to the host computer by using the second file.

* * * * *